United States Patent [19]
Barry et al.

[11] Patent Number: 6,167,501
[45] Date of Patent: Dec. 26, 2000

[54] METHODS AND APPARATUS FOR MANARRAY PE-PE SWITCH CONTROL

[75] Inventors: Edwin F. Barry; Gerald G. Pechanek, both of Cary; Thomas L. Drabenstott, Chapel Hill; Edward A. Wolff, Chapel Hill; Nikos P. Pitsianis, Chapel Hill; Grayson Morris, Durham, all of N.C.

[73] Assignee: Billions of Operations Per Second, Inc., Chapel Hill, N.C.

[21] Appl. No.: 09/169,256

[22] Filed: Oct. 9, 1998

Related U.S. Application Data

[60] Provisional application No. 60/008,148, Jun. 5, 1998.

[51] Int. Cl.$^7$ .................................................... G06F 15/16
[52] U.S. Cl. .................................................................. 712/11
[58] Field of Search ................................................ 712/11

[56] References Cited

U.S. PATENT DOCUMENTS

| | | | |
|---|---|---|---|
| 4,905,143 | 2/1990 | Takahashi et al. | 364/200 |
| 4,985,832 | 1/1991 | Grondalski | 364/200 |
| 5,542,074 | 7/1996 | Kim et al. | 395/800 |
| 5,546,336 | 8/1996 | Pechanek et al. | 364/725 |
| 5,577,262 | 11/1996 | Pechanek et al. | 395/890 |
| 5,598,545 | 1/1997 | Childers et al. | 395/562 |
| 5,612,908 | 3/1997 | Pechanek et al. | 364/736 |
| 5,659,785 | 8/1997 | Pechanek et al. | 395/800.11 |
| 5,682,491 | 10/1997 | Pechanek et al. | 395/385 |

*Primary Examiner*—David Y. Eng
*Attorney, Agent, or Firm*—Law Offices of Peter H. Priest

[57] ABSTRACT

Processing element to processing element switch connection control is described using a receive model that precludes communication hazards from occurring in a synchronous MIMD mode of operation. Such control allows different communication topologies and various processing effects such as an array transpose, hypercomplement or the like to be efficiently achieved utilizing architectures, such as the manifold array processing architecture. An encoded instruction method reduces the amount of state information and setup burden on the programmer taking advantage of the recognition that the majority of algorithms will use only a small fraction of all possible mux settings available. Thus, by means of transforming the PE identification based upon a communication path specified by a PE communication instruction an efficient switch control mechanism can be used. This control mechanism allows PE register broadcast operations as well as the standard mesh and hypercube communication paths over the same interconnection network. PE to PE communication instructions PEXCHG, SPRECV and SPSEND are also defined and implemented.

22 Claims, 35 Drawing Sheets

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | DSUopcode | | | | | | Rt | | | | | Rx | | | | | PeXchgSS | | | | | | | CE3 | | | |

FIG. 8E

SYNTAX/OPERATION

| INSTRUCTION | OPERANDS | OPERATION | ACF WORD |
|---|---|---|---|
| PEXCHG.PD.W | Rt,Rx, PEXCHGSS | DO OPERATION BELOW BUT DO NOT AFFECT ACFs | NONE |
| PEXCHG[CVNZ].PD.W | Rt,Rx, PEXCHGSS | PEPID: Rt ← INPUT PORT<br>PEPID: Rx → OUTPUT PORT | F0 |
| [TF].PEXCHG.PD.W | Rt,Rx, PEXCHGSS | DO OPERATION ONLY IF T/F CONDITION IS SATISFIED IN F0 | NONE |

ARITHMETIC FLAGS AFFECTED
N = MSB OF RESULT
Z = 1 IF A ZERO RESULT IS GENERATED, 0 OTHERWISE
V = NOT AFFECTED
C = NOT AFFECTED
CYCLES: 1

FIG. 9B

PEXCHG 2x2 OPERATION TABLE

| TARGET PE → | 0 | | 1 | | 2 | | 3 | |
|---|---|---|---|---|---|---|---|---|
| PEXCHG SWITCH SETTINGS | Src PE | Mux stgs | Src PE | Mux stgs | Src PE | Mux stgs | Src PE | Mux stgs |
| 2x2SWP0 | 1 | C,1 | 0 | C,0 | 3 | C,3 | 2 | C,2 |
| 2x2SWP1 | 2 | C,2 | 3 | C,3 | 0 | C,0 | 1 | C,1 |
| 2x2SWP2* | 3 | C,3 | 2 | C,2 | 1 | C,1 | 0 | C,0 |
| TRANSPOSE | 0 | C,0 | 2 | C,2 | 1 | C,1 | 3 | C,3 |
| DIAGONAL | 3 | C,3 | 1 | C,1 | 2 | C,2 | 0 | C,0 |
| SELF | 0 | C,0 | 1 | C,1 | 2 | C,2 | 3 | C,3 |
| 2x2PE0 | 0 | C,0 | 0 | C,0 | 0 | C,0 | 0 | C,0 |
| 2x2PE1 | 1 | C,1 | 1 | C,1 | 1 | C,1 | 1 | C,1 |
| 2x2PE2 | 2 | C,2 | 2 | C,2 | 2 | C,2 | 2 | C,2 |
| 2x2PE3 | 3 | C,3 | 3 | C,3 | 3 | C,3 | 3 | C,3 |
| 2x2RING1F | 2 | C,2 | 0 | C,0 | 3 | C,3 | 1 | C,1 |
| 2x2RING1R | 1 | C,1 | 3 | C,3 | 0 | C,0 | 2 | C,2 |
| 2x2RING2F | 3 | C,3 | 0 | C,0 | 1 | C,1 | 2 | C,2 |
| 2x2RING2R | 1 | C,1 | 2 | C,2 | 3 | C,3 | 0 | C,0 |

F = FORWARD
R = REVERSE

| TARGET PE → | 0 | | 1 | | 2 | | 3 | |
|---|---|---|---|---|---|---|---|---|
| PEXCHG SWITCH SETTINGS | Src PE | Mux stgs | Src PE | Mux stgs | Src PE | Mux stgs | Src PE | Mux stgs |
| 2x2SWP0 | 1 | C,1 | 0 | C,0 | 3 | C,3 | 2 | C,2 |
| 2x2SWP1 | 2 | C,2 | 3 | C,3 | 0 | C,0 | 1 | C,1 |
| 2x2SWP2* | 3 | C,3 | 2 | C,2 | 1 | C,1 | 0 | C,0 |
| TRANSPOSE | 0 | C,0 | 2 | C,2 | 1 | C,1 | 3 | C,3 |
| DIAGONAL | 3 | C,3 | 1 | C,1 | 2 | C,2 | 0 | C,0 |
| SELF | 0 | C,0 | 1 | C,1 | 2 | C,2 | 3 | C,3 |
| 2x2PE0 | 0 | C,0 | 0 | C,0 | 0 | C,0 | 0 | C,0 |
| 2x2PE1 | 1 | C,1 | 1 | C,1 | 1 | C,1 | 1 | C,1 |
| 2x2PE2 | 2 | C,2 | 2 | C,2 | 2 | C,2 | 2 | C,2 |
| 2x2PE3 | 3 | C,3 | 3 | C,3 | 3 | C,3 | 3 | C,3 |
| 2x2RING1F | 2 | C,2 | 0 | C,0 | 3 | C,3 | 1 | C,1 |
| 2x2RING1R | 1 | C,1 | 3 | C,3 | 0 | C,0 | 2 | C,2 |
| 2x2RING2F | 3 | C,3 | 0 | C,0 | 1 | C,1 | 2 | C,2 |
| 2x2RING2R | 1 | C,1 | 2 | C,2 | 3 | C,3 | 0 | C,0 |

F = FORWARD
R = REVERSE

FIG. 11A

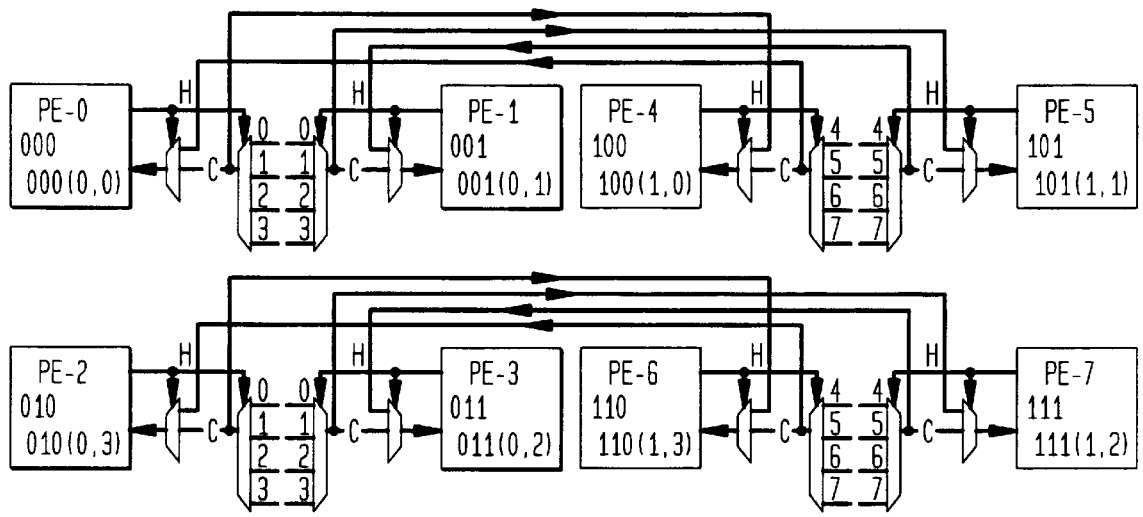

FIG. 11B

| TARGET PE → | 0 | | 1 | | 2 | | 3 | | 4 | | 5 | | 6 | | 7 | |
|---|---|---|---|---|---|---|---|---|---|---|---|---|---|---|---|---|
| PEXCHG SWITCH SETTINGS | Src PE | Mux stgs | Src PE | Mux stgs | Src PE | Mux stgs | Src PE | Mux stgs | Src PE | Mux stgs | Src PE | Mux stgs | Src PE | Mux stgs | Src PE | Mux stgs |
| 2x2RING1F | 2 | C,2 | 0 | C,0 | 3 | C,3 | 1 | C,1 | 6 | C,6 | 4 | C,4 | 7 | C,7 | 5 | C,5 |
| 2x2RING1R | 1 | C,1 | 3 | C,3 | 0 | C,0 | 2 | C,2 | 5 | C,5 | 7 | C,7 | 4 | C,4 | 6 | C,6 |
| 2x2RING2F | 3 | C,3 | 0 | C,0 | 1 | C,1 | 2 | C,2 | 7 | C,7 | 4 | C,4 | 5 | C,5 | 6 | C,6 |
| 2x2RING2R | 1 | C,1 | 2 | C,2 | 3 | C,3 | 0 | C,0 | 5 | C,5 | 6 | C,6 | 7 | C,7 | 4 | C,4 |
| 2x4RING1F | 7 | H,3 | 0 | C,0 | 1 | C,1 | 2 | C,2 | 3 | H,7 | 4 | C,4 | 5 | C,5 | 6 | C,6 |
| 2x4RING1R | 1 | C,1 | 2 | C,2 | 3 | C,3 | 4 | H,0 | 5 | C,6 | 6 | C,6 | 7 | C,7 | 0 | H,4 |
| 2x2SWP0* | 1 | C,1 | 0 | C,0 | 3 | C,3 | 2 | C,2 | 5 | C,5 | 4 | C,4 | 6 | C,6 | 7 | C,7 |
| 2x2SWP1* | 2 | C,2 | 3 | C,3 | 0 | C,0 | 1 | C,1 | 6 | C,6 | 7 | C,7 | 4 | C,00 | 5 | C,5 |
| 2x2SWP2 | 3 | C,3 | 2 | C,2 | 1 | C,1 | 0 | C,0 | 7 | C,7 | 6 | C,6 | 5 | C,5 | 4 | C,4 |
| 2x4SWP0* | 4 | H,0 | 5 | H,1 | 6 | H,2 | 7 | H,3 | 0 | H,4 | 1 | H,5 | 2 | H,6 | 3 | H,7 |
| 2x4SWP1 | 5 | H,1 | 4 | H,0 | 7 | H,3 | 6 | H,2 | 1 | H,5 | 0 | H,4 | 3 | H,7 | 2 | H,6 |
| 2x4SWP2** | 7 | H,3 | 6 | H,2 | 5 | H,1 | 4 | H,0 | 3 | H,7 | 2 | H,6 | 1 | H,5 | 0 | H,4 |
| 2x4SWP3 | 6 | H,2 | 7 | H,3 | 4 | H,0 | 5 | H,1 | 2 | H,6 | 3 | H,7 | 0 | H,4 | 1 | H,5 |
| TRANSPOSE | 0 | C,0 | 2 | C,2 | 1 | C,1 | 3 | C,3 | 4 | C,4 | 6 | C,6 | 5 | C,1 | 7 | C,7 |
| DIAGONAL | 3 | C,3 | 1 | C,1 | 2 | C,2 | 0 | C,0 | 7 | C,7 | 5 | C,5 | 6 | C,6 | 4 | C,4 |
| SELF | 0 | C,0 | 1 | C,1 | 2 | C,2 | 3 | C,3 | 4 | C,4 | 5 | C,5 | 6 | C,6 | 7 | C,7 |
| 2x2PE0 | 0 | C,0 | 0 | C,0 | 0 | C,0 | 0 | C,0 | 4 | C,4 | 4 | C,4 | 4 | C,4 | 4 | C,4 |
| 2x2PE1 | 1 | C,1 | 1 | C,1 | 1 | C,1 | 1 | C,1 | 5 | C,1 | 5 | C,1 | 5 | C,1 | 5 | C,1 |
| 2x2PE2 | 2 | C,2 | 2 | C,2 | 2 | C,2 | 2 | C,2 | 6 | C,6 | 6 | C,6 | 6 | C,6 | 6 | C,6 |
| 2x2PE3 | 3 | C,3 | 3 | C,3 | 3 | C,3 | 3 | C,3 | 7 | C,7 | 7 | C,7 | 7 | C,7 | 7 | C,7 |
| 2x4PE0 | 0 | C,0 | 0 | C,0 | 0 | C,0 | 0 | C,0 | 0 | H,(4) | 0 | H,(4) | 0 | H,(4) | 0 | H,(4) |
| 2x4PE1 | 1 | C,1 | 1 | C,1 | 1 | C,1 | 1 | C,1 | 1 | H,(5) | 1 | H,(5) | 1 | H,(5) | 1 | H,(5) |
| 2x4PE2 | 2 | C,2 | 2 | C,2 | 2 | C,2 | 2 | C,2 | 2 | H,(6) | 2 | H,(6) | 2 | H,(6) | 2 | H,(6) |
| 2x4PE3 | 3 | C,3 | 3 | C,3 | 3 | C,3 | 3 | C,3 | 3 | H,(7) | 3 | H,(7) | 3 | H,(7) | 3 | H,(7) |
| 2x4PE4 | 4 | H,(0) | 4 | H,(0) | 4 | H,(0) | 4 | H,(0) | 4 | C,4 | 4 | C,4 | 4 | C,4 | 4 | C,4 |
| 2x4PE5 | 5 | H,(1) | 5 | H,(1) | 5 | H,(1) | 5 | H,(1) | 5 | C,5 | 5 | C,5 | 5 | C,5 | 5 | C,5 |
| 2x4PE6 | 6 | H,(2) | 6 | H,(2) | 6 | H,(2) | 6 | H,(2) | 6 | C,6 | 6 | C,6 | 6 | C,6 | 6 | C,6 |
| 2x4PE7 | 7 | H,(3) | 7 | H,(3) | 7 | H,(3) | 7 | H,(3) | 7 | C,7 | 7 | C,7 | 7 | C,7 | 7 | C,7 |

F = FORWARD
R = REVERSE

H,( ) = H SELECTED, ( ) NOT NECESSARY FOR OPERATION BUT HARDWARE WILL SET TARGET PE's C MUX FOR SYNCHRONOUS MIND USE

FIG. 16

| 0<br>0000<br>(0,0)<br>0000 | 1<br>0001<br>(3,1)<br>1001 | 4<br>0100<br>(1,0)<br>0100 | 5<br>0101<br>(0,1)<br>0001 |
|---|---|---|---|
| 2<br>0010<br>(1,3)<br>0110 | 3<br>0011<br>(2,2)<br>1111 | 6<br>0110<br>(2,3)<br>1110 | 7<br>0111<br>(3,2)<br>11 |
| 8<br>1000<br>(3,0)<br>1000 | 9<br>1001<br>(2,1)<br>1101 | 12<br>1100<br>(2,0)<br>1100 | 13<br>1101<br>(1,1)<br>0101 |
| 10<br>1010<br>(0,3)<br>0010 | 11<br>1011<br>(1,2)<br>0111 | 14<br>1110<br>(3,3)<br>1010 | 15<br>1111<br>(0,2)<br>0011 |

COMOP: 00100000 (4X4 TRANSPOSE)
Mux Ctrl Bits=0,0,E,F

FIG. 22A

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | DSUopcode | | | | | Rt | | | | | Rx | | | | | SpRecvSS | | | | | | | | | CE3 | |

FIG. 22B

SYNTAX, OPERATION

| INSTRUCTION | OPERANDS | OPERATION | ACF |
|---|---|---|---|
| SPRECV.PD.W | Rt, Rx, SpRecvSS | DO OPERATION BELOW BUT DO NOT AFFECT ACFs | NONE |
| SPRECV[CVNZ].PD.W | Rt, Rx, SpRecvSS | OUTPUT PORT → PE Rx<br>SP Rt → PE0 INPUT PORT | F0 |
| [TF].SPRECV.PD.W | Rt, Rx, SpRecvSS | DO OPERATION ONLY IF T/F CONDITION IS SATISFIED IN F0 | NONE |

ARITHMETIC FLAGS AFFECTED
N=MSB OF RESULT
Z=1 IF RESULT IS ZERO, 0 OTHERWISE
V=NOT AFFECTED
C=NOT AFFECTED
CYCLES:1

SPRECV OPERATIONS FOR A 2x2 CONFIGURATION:

| Target PE→ | 0 | |
|---|---|---|
| SpRecv Switch Settings | Src PE | Mux stgs |
| 2x2_PE0 | 0 | C,0 |
| 2x2_PE1 | 1 | C,1 |
| 2x2_PE2 | 2 | C,2 |
| 2x2_PE3 | 3 | C,3 |

SPRECV OPERATIONS FOR A 2x4 CONFIGURED AS TWO 2x2s:

| Target PE → | 0 | |
|---|---|---|
| SpRecv Switch Settings | Src PE | Mux stgs |
| 2x2_PE0 | 0 | C,0 |
| 2x2_PE1 | 1 | C,1 |
| 2x2_PE2 | 2 | C,2 |
| 2x2_PE3 | 3 | C,3 |

SPRECV OPERATIONS FOR A 2x4 CONFIGURATION:

| Target PE □ | 0 | | 4 | |
|---|---|---|---|---|
| SpRecv Switch Settings | Src PE | Mux stgs | Src PE | Mux stgs |
| 2x4_PE0 | 0 | C,0 | -- | -- |
| 2x4_PE1 | 1 | C,1 | -- | -- |
| 2x4_PE2 | 2 | C,2 | -- | -- |
| 2x4_PE3 | 3 | C,3 | -- | -- |
| 2x4_PE4 | 4 | H,(0) | -- | C,4 |
| 2x4_PE5 | 5 | H,(1) | -- | C,5 |
| 2x4_PE6 | 6 | H,(2) | -- | C,6 |
| 2x4_PE7 | 7 | H,(3) | -- | C,7 |
| 2x2_PE0 | 0 | C,0 | 4 | C,4 |
| 2x2_PE1 | 1 | C,1 | 5 | C,5 |
| 2x2_PE2 | 2 | C,2 | 6 | C,6 |
| 2x2_PE3 | 3 | C,3 | 7 | C,7 |

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | | DSUopcode | | | | | | Rt | | | | | Rx | | | | | | SpSendSS | | | | | CE3 | | |

FIG. 23B

SYNTAX, OPERATION

| INSTRUCTION | OPERANDS | OPERATION | ACF |
|---|---|---|---|
| | | | 2x2 |
| SPSEND.PD.W | Rt, Rx, 2x2 | DO OPERATION BELOW BUT DO NOT AFFECT ACFs | NONE |
| SPSEND[CVNZ].PD.W | Rt, Rx, 2x2 | PE0 Rt ← SP Rx<br>PE1 Rt ← SP Rx<br>PE2 Rt ← SP Rx<br>PE3 Rt ← SP Rx | F0 |
| [TF].SPSEND.PD.W | Rt, Rx, 2x2 | DO OPERATION ONLY IF T/F CONDITION IS SATISFIED IN F0 | NONE |
| | | | 2x4 |
| SPSEND.PD.W | Rt, Rx, 2x4 | DO OPERATION BELOW BUT DO NOT AFFECT ACFs | NONE |
| SPSEND[CVNZ].PD.W | Rt, Rx, 2x4 | PE0 Rt ← SP Rx<br>PE1 Rt ← SP Rx<br>PE2 Rt ← SP Rx<br>PE3 Rt ← SP Rx<br>PE4 Rt ← SP Rx<br>PE5 Rt ← SP Rx<br>PE6 Rt ← SP Rx<br>PE7 Rt ← SP Rx | F0 |
| [TF].SPSEND.PD.W | Rt, Rx, 2x4 | DO OPERATION ONLY IF T/F CONDITION IS SATISFIED IN F0 | NONE |
| | | | 4x4 |
| SPSEND.PD.W | Rt, Rx, 4x4 | DO OPERATION BELOW BUT DO NOT AFFECT ACFs | NONE |
| SPSEND[CVNZ].PD.W | Rt, Rx, 4x4 | PE0 Rt ← SP Rx<br>PE1 Rt ← SP Rx<br>PE2 Rt ← SP Rx<br>PE3 Rt ← SP Rx<br>PE4 Rt ← SP Rx<br>PE5 Rt ← SP Rx<br>PE6 Rt ← SP Rx<br>PE7 Rt ← SP Rx<br>PE8 Rt ← SP Rx<br>PE9 Rt ← SP Rx<br>PE10 Rt ← SP Rx<br>PE11 Rt ← SP Rx<br>PE12 Rt ← SP Rx<br>PE13 Rt ← SP Rx<br>PE14 Rt ← SP Rx<br>PE15 Rt ← SP Rx | F0 |
| [TF].SPSEND.PD.W | Rt, Rx, 4x4 | DO OPERATION ONLY IF T/F CONDITION IS SATISFIED IN F0 | NONE |

ARITHMETIC SCALAR FLAGS AFFECTED
N=MSB OF RESULT
Z=1 IF A ZERO RESULT IS GENERATED, 0 OTHERWISE
V=NOT AFFECTED
C=NOT AFFECTED
CYCLES:1

METHODS AND APPARATUS FOR MANARRAY PE-PE SWITCH CONTROL

This application claims priority from the Provisional application Ser. No. 60/008,148 filed Jun. 5, 1998.

FIELD OF INVENTION

The present invention relates generally to improvements to manifold array ("ManArray") processing, and more particularly to processing element (PE)-PE switch control to effect different communication patterns or to achieve various processing effects such as an array transpose, hypercomplement operation or the like.

BACKGROUND OF INVENTION

The ManArray processor or architecture consists generally of a topology of Processing Elements (PEs) and a controller Sequence Processor (SP) which dispatches instructions to the PEs, i.e. a single instruction stream, to effect parallel multiple data operations in the array of PEs. In addition, the ManArray is a scalable array that uses unique PE labels and scalable decoding and control logic to achieve a set of useful communication patterns, lower latency of communications, and lower switch and bus implementation costs than other approaches which support the same or a similar set of communication patterns.

In more detail, the ManArray organization of PEs contains a cluster switch external to groups of PEs (PE Clusters) that is made up of a set of multiplexers which provide the North, South, East, West, hypercube, as well as non-traditional transpose and hypercomplement communications and other paths between different PEs. During program execution, it is desirable to control the multiplexer paths of the ManArray collectively referred to as the switching network or switch to achieve desirable processing effects such as an array transpose or hypercomplement. Since the ManArray organization supports virtual PE identities or labels, multiple organizations of PEs, such as torus and hypercube, and their associated connectivity patterns can be easily obtained. In addition, to support Synchronous MIMD operations, where PEs can independently execute different instructions in synchronism, the Receive Model for communications is used. The Receive Model specifies that the input data path to a PE is controlled by that PE, while the data output from a PE is made available to the network cluster switch or multiplexers. There is a distinct difference between the concept of sending data to a neighboring PE and the concept of receiving data from a neighboring PE. The difference is how the paths between the PEs are controlled and the operations that are possible without hazards occurring. The ManArray supports computational autonomy in its Processing Elements (PEs), as described in Provisional application Ser. No. 60/064,619 entitled Methods and Apparatus for Efficient Synchronous MIMD VLIW Communications. In the Receive Model, each PE controls the multiplexers that select the data paths from PEs within its own cluster of PEs and from orthogonal clusters of PEs. Since the PE controls the multiplexers associated with the path it selects to receive data from, there can be no communications hazard. Alternatively, in the Send Model, communications hazards can occur since multiple PEs can target the same PE for sending data to. With Synchronous MIMD VLIW communications, the PEs are programmed to cooperate in receiving and making data available. The ManArray Receive Model specifies the data each PE is to make available at the multiplexer inputs within its cluster of PEs. Cooperating PEs are a pair of PEs that have operations defined between them. In addition, multiple sets of cooperating PEs can have Receive Instructions in operation at the same time. The source PE of a cooperating pair makes the instruction-specified-data available, and the target PE of the pair provides the proper multiplexer control to receive the specified-data made available by the cooperating PE. For some PE to PE communications, a partner PE is required. A partner PE is an intermediary PE that provides the connecting link between two cooperating PEs located in two clusters of PEs.

SUMMARY OF THE INVENTION

One problem addressed by the present invention may be stated as follows. Given an array of Processing Elements (PEs), a set of connectivity patterns, and PE labelings associated with different organizations of PEs in the array, how do you logically control the communication operations between PEs with an efficient programming mechanism that minimizes the latency of communications and results in a simple control apparatus? The solution to this problem should desirably support single-cycle register-to-register communications, Synchronous Multiple Instruction Multiple Data stream (synchronous-MIMD) operations, PE broadcast, and classical Single Instruction Multiple Data stream (SIMD) communication patterns such as North, South, East, West, hypercube, as well as non-traditional transpose and hypercomplement communications among others.

The present invention provides novel solutions to this problem by using the ManArray methods and apparatus for PE-PE switch control as described further below. In addition, the present invention provides a variety of novel multiplexer control arrangements as also discussed in greater detail below.

Each ManArray PE is preferably defined as requiring only a single transmit/receive port independent of the implemented topology requirements. For example, the 4-neighborhood torus topology is typically implemented with each PE having four ports, one for each neighborhood direction, while the ManArray requires only a single port per PE. In the ManArray organization of PEs, when a communication operation is desired, the programmer encodes a communication instruction with the information necessary to specify the communication operation that is to occur. For example, the source and destination registers as well as the type of operation (register swap operations between pairs of PEs, transpose, Hypercomplement, etc.) are encoded in the communication instruction. This instruction is then dispatched by the SP controller to the PEs. In the PEs, the transformation of ManArray communication instruction encoding to cluster switch multiplexer controls is dependent upon the specific PE label, the type of communication model that is used, and the ManArray multiplexer switch design. By controlling the multiplexers that route the data, it is possible to effect different communication topologies. One of the novel capabilities with this control mechanism is the ability of PEs to broadcast to other PEs in the topology. The PE broadcast capability becomes feasible using the communication network of cluster switches/multiplexers without requiring any additional buses. In the ManArray, the PE broadcast can suitably be a SIMD instruction since all PEs receive the same instruction and they all control their cluster switch multiplexers appropriately to select a single specified PE path for data to be received from.

Specifically, communication occurs between processing elements which are connected in a regular topology consisting of a hierarchy of clusters. A cluster consists of one or more processing elements (PEs) which have at least one bi-directional communication path. Multiple clusters may be grouped to form a cluster at the next level of the hierarchy. In the ManArray, the beginning cluster is a 2×2 array although larger and smaller number of PEs in a cluster are not precluded. The PEs are connected with cluster switch multiplexers.

These cluster switch multiplexers are controlled by an apparatus that transforms two inputs into the output multiplexer control bits. The first input is the set of encoded bits received from a communication instruction that describe the communication pattern desired. The second input is the identity of the PE. The problem is to determine how to advantageously control these multiplexers or switching network. Four transformation methods are discussed.

REGISTER MODE CONTROL METHOD

A register method in accordance with the present invention provides a simple hardware implementation for controlling the cluster switch multiplexers. In this transformation apparatus, the first input is the set of encoded bits received from a communication instruction that describes the communication pattern desired. The second identity-of-the-PE input is not used in the hardware, but is used by the programmer to create the bit patterns to be loaded into each PE. This approach requires one register bit per multiplexer (mux) control line per PE that is directly connected to the mux control. To change the switch, i.e. muxes, you simply write (load) to the register bits that are wired to the mux control. As an example, in a 2×2 ManArray, there are two bits of control per PE, and thus two bits of storage are required per PE to control each multiplexer. All 2×2 PE to PE cluster switches can be controlled with a total of 8 bits.

One advantage of this method is simplicity of implementation, but it incurs a number of disadvantages. The first disadvantage is the latency of setup required to achieve a particular communication path. This latency increases as the number of PEs increases. A second disadvantage is that the number of bits per register increases as the size of the array increases. A third disadvantage is that the programmer must treat the multiplexer control registers as state information which must be remembered and stored on context switching events. Further, the programmer must know all the multiplexer bit settings for each PE required to cause the desired communication patterns.

REGISTER TABLE METHOD

To overcome the penalty for frequently changing the mux control registers, a register-table apparatus in accordance with the present invention may be used. The register-table method is similar to the register method except instead of having only one register per PE there is a set or table of registers. In this transformation apparatus, the first input is the set of encoded bits received from a communication instruction that describe the communication pattern desired. The second identity-of-the-PE input is not used in the hardware, but is used by the programmer to create the multiple bit patterns to be loaded into each PE's table of registers. This approach allows the programmer to set up the table less often, for example during program initialization, and maybe only once, with the frequently used communication paths and then select the desired mux settings during program execution. Assuming the register table is large enough to support a complete program then during that program execution, the register-table set up latency is avoided. The communication instruction contains a bit field that is used to select which entry in the table is to be used to set up the mux controls.

An advantage of this method is its simplicity of implementation, but relative to the register mode control method, it requires a hardware increase by a factor equal to the number of entries in the table plus some register selection logic. A disadvantage of the register table approach is that the number of bits per register increases as the size of the array increases. A second disadvantage is that the programmer must treat the set of multiplexer control registers as state information which must be remembered and stored on context switching events. Further the programmer must know all the multiplexer bit settings required by each PE to cause the desired communication patterns in order to load the registers.

ROM TABLE METHOD

To overcome the penalty for set up latency and communication pattern context storage the table entries may advantageously be stored in a Read Only Memory (ROM) at the manufacturing site. The ROM table apparatus also removes the requirement that the application programmer has to know the table entries for each PE. In this transformation apparatus, the first input is the set of encoded bits received from a communication instruction that describes the communication pattern desired. The second identity-of-the-PE input is not used in the hardware, but is used by the manufacturer to create the bit patterns to be stored in the ROMs in each PE.

One advantage for this method is its simplicity of implementation, and it represents one of the presently preferred methods to solve the initially stated problem. Disadvantages are that different ROMs are required in each PE, and embedded ROMs may cause physical design problems depending upon the implementation technology.

PE IDENTITY TRANSFORMATION METHOD

Since the ROM Table method requires a different ROM per PE and embedded ROMs may cause physical design problems depending upon the implementation technology, the PE Identity Translation Method has been developed to avoid these disadvantages. In this transformation apparatus, the first input is the set of encoded bits received from a communication instruction that describes the communication pattern desired. The second identity-of-the-PE input is also used in the logic. The transformation logic in each PE transforms a Target PE Identity, Physical Identity (PID) or Virtual Identity (VID), to a Source PE Physical Identity (PID source) that maps directly to the Cluster Switch Mux Control signals or bits. The virtual organization of PEs may be set up using mode control information. Though, it is noted that with a limited number of virtual organizations supported, the mode control information would not be needed. With virtual mode control information available (by either programming or by default) in the PEs, the communication operation specification can be of a higher or more generic level. For example, there may be only one transpose communication operation encoded in a communication instruction independent of the array size. The single transpose instruction would be defined to work across the supported virtual topologies based upon the virtual mode control information available in each PE. In the preferred embodiment, however, no virtual mode control information is required to be separately stored in each PE since a limited number of virtual organizations is presently planned and the PE organization information is conveyed in the communication instructions as the first input to the PE Identity Transformation logic. For example, an instruction, PEXCHG 2×2$_{RING}$1F, dispatched to a 2×2 cluster in a 2×4 topology defines the operation as limited to the four PEs in the 2×2 sub cluster.

An advantage of this approach is that it is scalable and uses the same transformation logic implementation in each PE. Due to this consistency across all PEs it is presently considered to be the preferred choice for implementation.

These and other features, aspects, and advantages of the invention will be apparent to those skilled in the art from the following detailed description taken together with the accompanying drawings.

BRIEF DESCRIPTION OF DRAWINGS

FIG. 8E illustrates PEXCHG syntax and operation on a per PE basis;

FIG. 9B shows the PEXCGH 2×2 operation table;

FIGS. 11A and 11B illustrate aspects of operation of PEs configured as a 2×4 with one SP controlling the eight PEs;

FIG. 16 illustrates a 4×4 transpose operation;

FIGS. 22A and 22B illustrate an SPRECV instruction and aspects of syntax/operation utilizing that instruction;

FIGS. 22E and 22F illustrate SPRECV operations in a 2×4 configured as two 2×2s;

FIGS. 22G and 22H illustrate aspects of SPRECV operations for a 2×4 configuration; and FIGS. 23A and 23B illustrate aspects of the register broadcast (SPSEND) instruction and operation therewith.

DETAILED DESCRIPTION

Further details of a presently preferred ManArray architecture are found in United States Patent application Ser. Nos. 08/885,310 and 08/949,122 filed Jun. 30, 1997 and Oct. 10, 1997, respectively, Provisional application Ser. No. 60/064,619 entitled Methods and Apparatus for Efficient Synchronous MIMD VLIW Communications" filed Nov. 7, 1997, Provisional application Ser. No. 60/067,511 entitled "Method and Apparatus for Dynamically Modifying Instructions in a Very Long Instruction Word Processor" filed Dec. 4, 1997, Provisional application Ser. No. 60/068,021 entitled "Methods and Apparatus for Scalable Instruction Set Architecture" filed Dec. 18, 1997, Provisional application Ser. No. 60/071,248 entitled "Methods and Apparatus to Dynamically Expand the Instruction Pipeline of a Very Long Instruction Word Processor" filed Jan. 12, 1998, and Provisional application Ser. No. 60/072,915 entitled "Methods and Apparatus to Support Conditional Execution in a VLIW-Based Array Processor with Subword Execution" filed Jan. 28, 1998, all of which are assigned to the assignee of the present invention and incorporated herein by reference in their entirety.

Figure 1A:
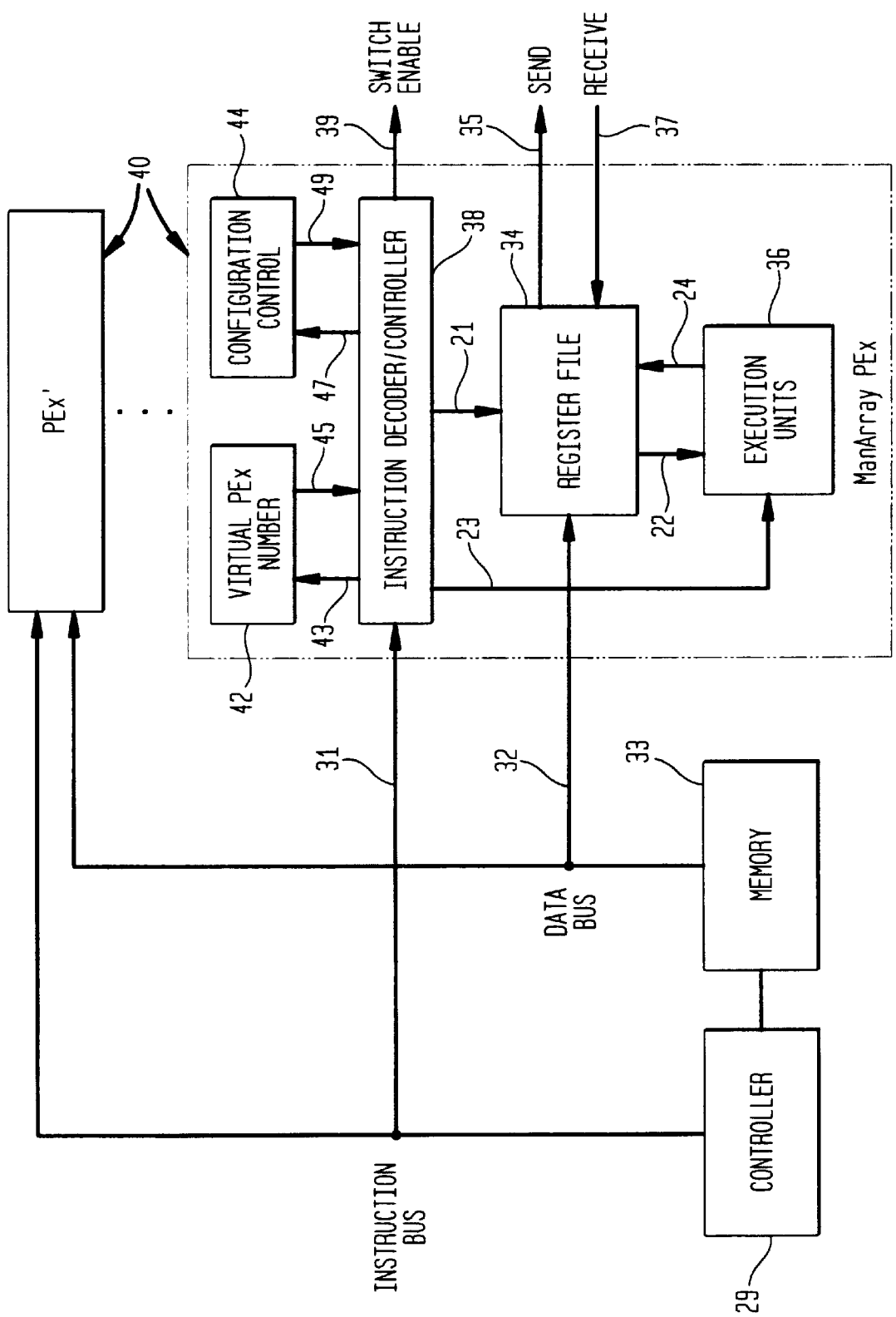
FIGS. 1A–1C are block diagrams of processing elements which may suitably be employed within PE arrays in accordance with the present invention.
Figure 1B:
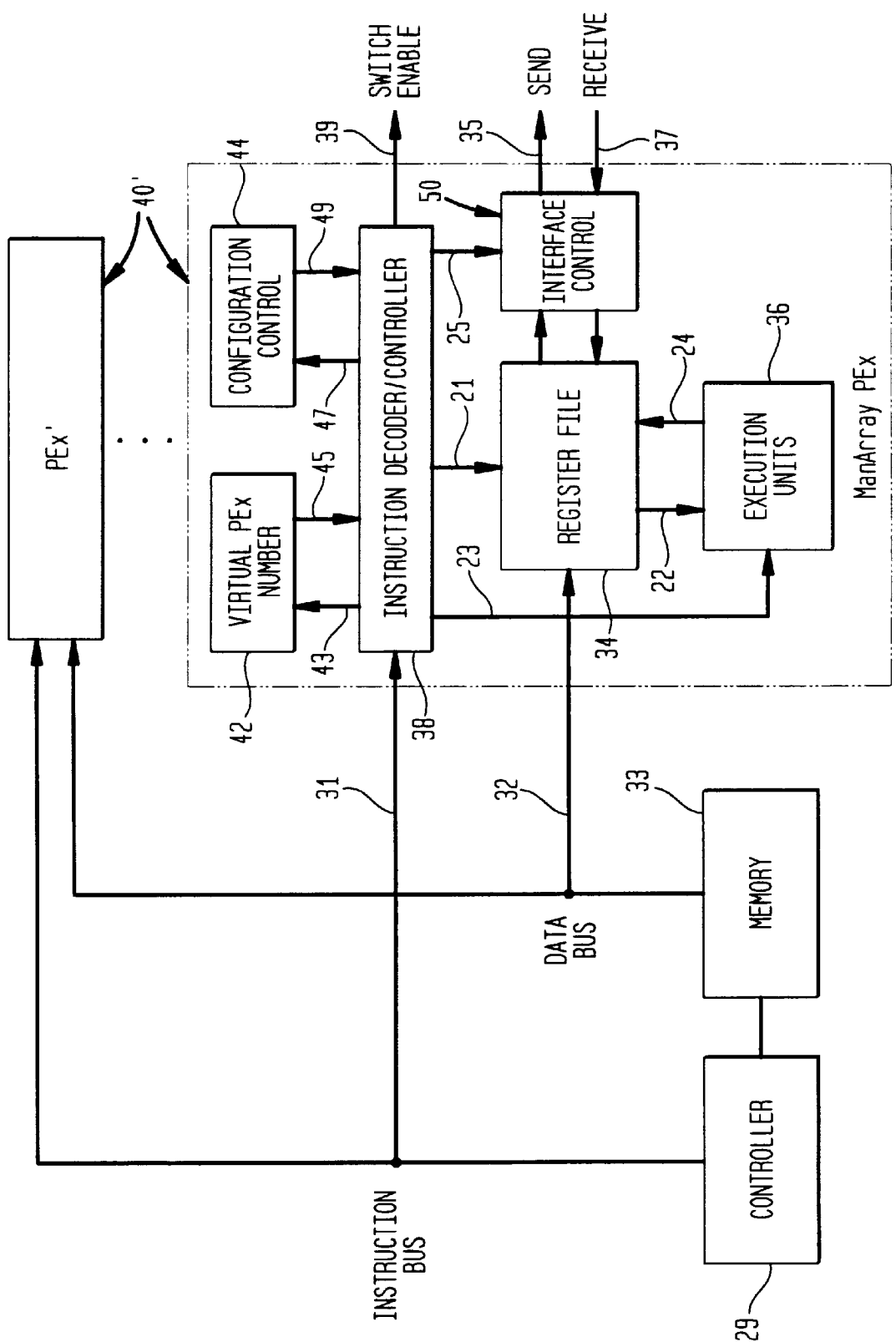
Figure 1C:
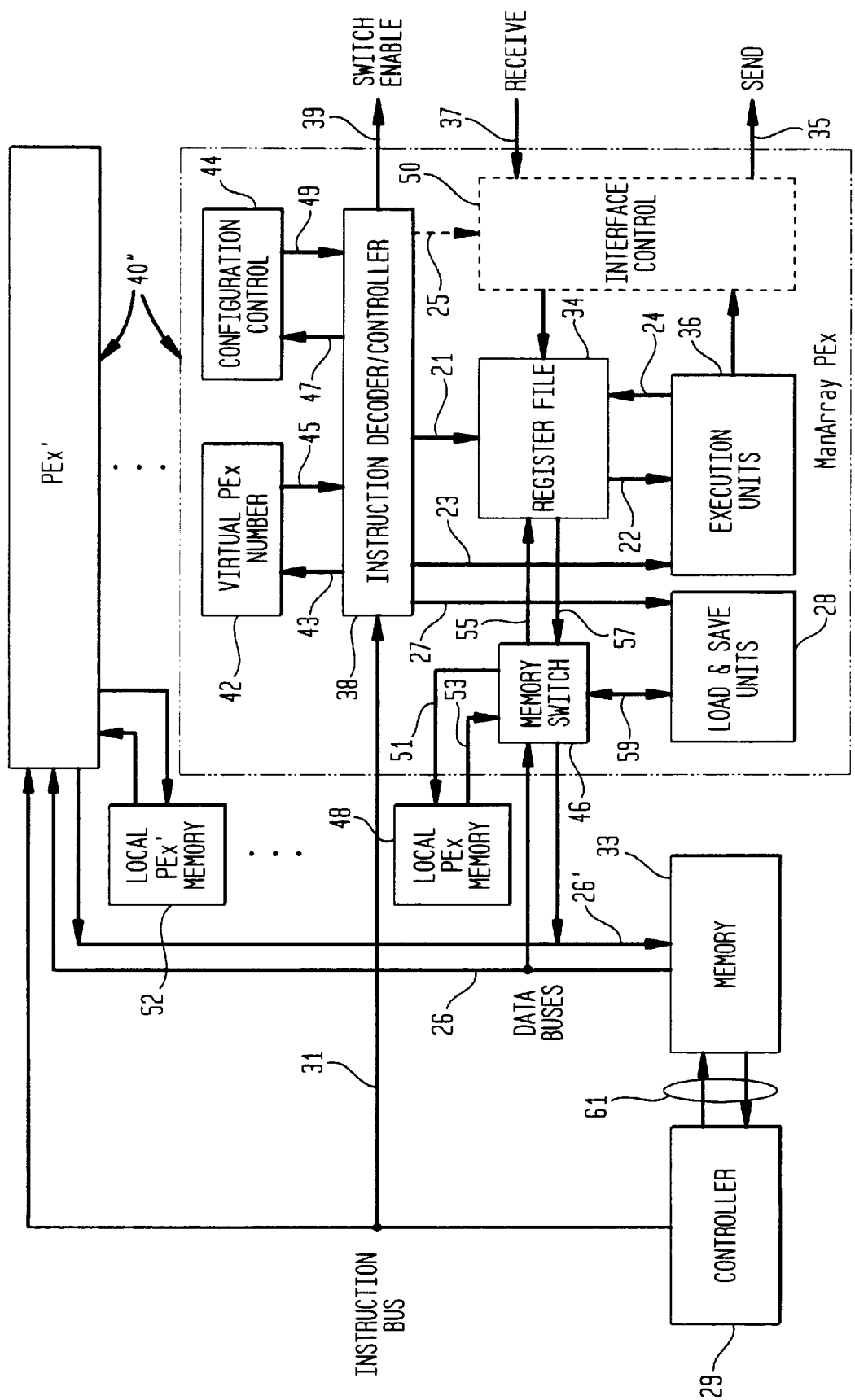

Suitable PEs for use in arrays operating in conjunction with the present invention are shown in FIGS. 1A–1C and described below. The PEs may be single microprocessor chips of the Single Instruction-stream Single Data-stream (SISD) type. Though not limited to the following description, a basic PE will be described to demonstrate the concepts involved. FIG. 1A shows the basic structure of a PE 40 illustrating one suitable embodiment which may be utilized for each PE in an array. For simplicity of illustration, interface logic and buffers are not shown. An instruction bus 31 is connected to receive dispatched instructions from a SIMD controller 29, a data bus 32 is connected to receive data from memory 33 or another data source external to the PE 40. A register file storage medium 34 provides source operand data to execution units 36. An instruction decoder/controller 38 is connected to receive instructions through the instruction bus 31 and to provide control signals via a bus 21 to registers within the register file 34. The registers of the file 34 provide their contents via path 22 as operands to the execution units 36. The execution units 36 receive control signals 23 from the instruction decoder/controller 38 and provide results via path 24 to the register file 34. The instruction decoder/controller 38 also provides cluster switch enable signals on an output line 39 labeled Switch Enable.

A virtual PE storage unit 42 is connected to the instruction decoder/controller 38 through respective store 43 and retrieve 45 lines. The virtual PE number may be programmed by the controller 29 via instructions received at the decoder/controller 38, which transmits the new virtual PE number to the storage unit 42. The virtual PE number may be used by the controller 29 to dynamically control the position of each PE within a topology, within the limits imposed by the connection network. If the controller and array supports one or a small number of virtual topologies, then the virtual PE number can be fixed in the PEs.

A configuration controller 44 is connected through respective store 47 and retrieve 49 lines to the instruction decoder/controller 38. The configuration controller 44 provides configuration information, such as the current configuration and provides the control information to cluster switches. These switches control the connection of PEs to other PEs within the array. The decoder/controller 38 combines the current configuration from the configuration controller 44, the virtual PE address from the virtual PE storage unit 42, and communication operation information, such as "communicate between transpose PEs" conveyed by instructions from the controller 29 and communicates this information to the cluster switches. The decoder/controller 38 includes switch control logic which employs this information to determine the proper settings for cluster switches, and transmits this information through the switch enable interface 39. It will be recognized that a variety of mechanisms may be employed to complement the switch control logic. The switch control logic, a cluster switch instruction decoder/controller, and a configuration controller could be incorporated in the cluster switches, outside the bounds of the PE. It is possible to separate these functions since the new PE node is defined as independent of the topology connections. In the presently preferred embodiment, the total logic and overall functionality are improved by not separating the control functions, even though the control functions are independent.

SCALABLE CLUSTER SWITCHES

Figure 1D:
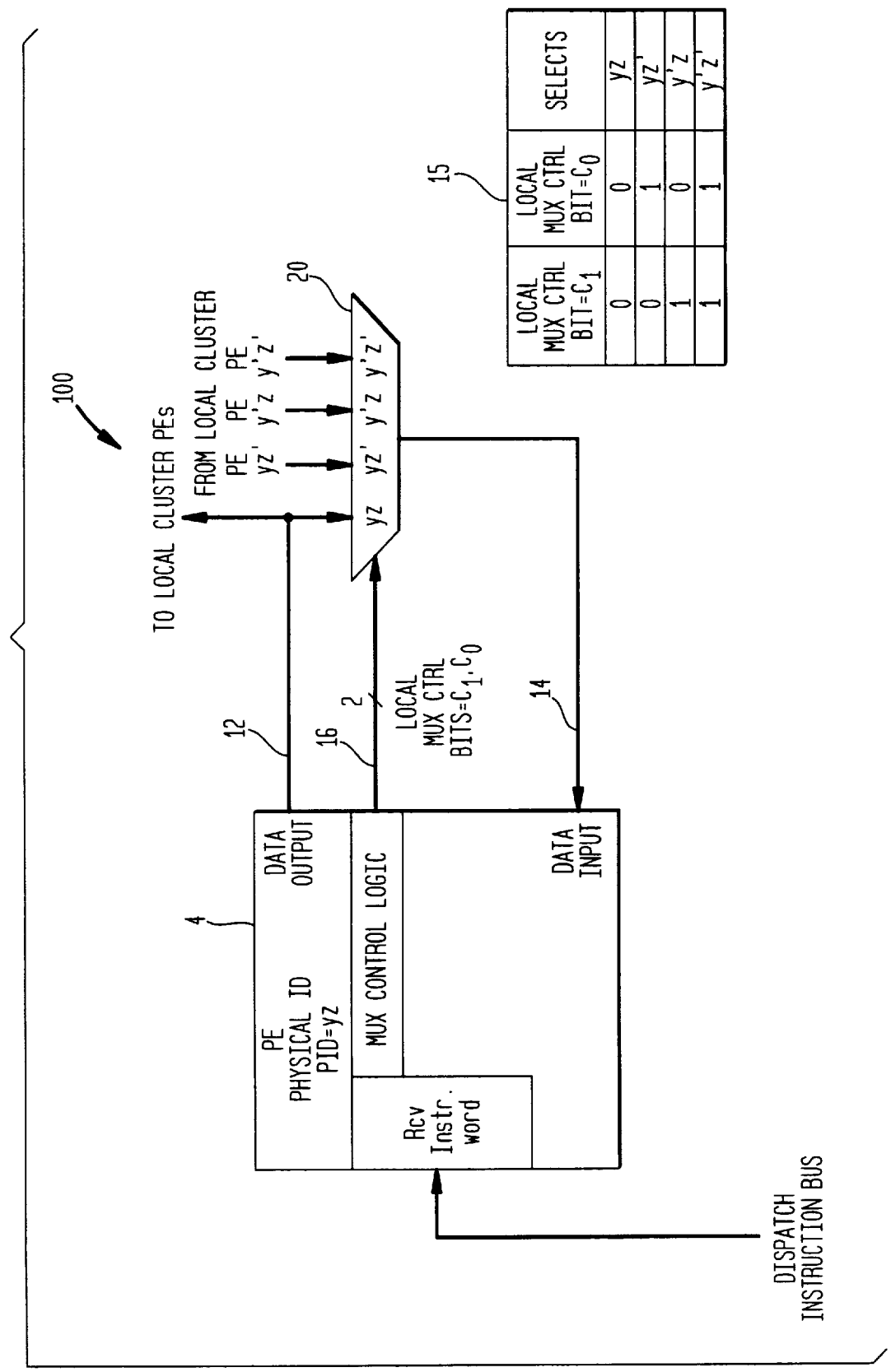
FIG. 1D illustrates a 2×2 PE receive multiplexer.

In general, a ManArray cluster switch in accordance with the present invention is made up of a set of multiplexers as shown in FIGS. 1D, 2, 3, and 4. FIG. 1D illustrates a 2×2 receive multiplexer 100. In FIG. 1D, a PE 4 is connected to a multiplexer 20 in a 2×2 arrangement. PE 4 has a single data output 12 and a single data input 14, both of which are preferably of a standard bus width size 8, 16, 32, or 64 bits, though any size bus is feasible. The data output 12 is typically sourced from an internal register located in a register file as specified by an instruction. The data input 14 is typically loaded into an internal register located in a register file as specified by an instruction. In addition, PE 4 includes a multiplexer control output 16 that controls the selection of an input bus at multiplexer 20. The Local Mux Ctrl Bits $C_1, C_0$ are defined in a table 15 showing the $C_1, C_0$ values and the data path that is selected through multiplexer 20. The data path, for example the path for PE yz', represents the data output 12 from PE yz'. The PE is generically labeled with a binary Physical ID=yz (PID) where, for a 2×2 cluster yz indicates the label of the PE within the cluster. In general for larger organizations of PEs, the PID is defined as follows:

| Plane ID | Cluster ID | Local ID |
|----------|------------|----------|
| uv       | wx         | yz       |

This PID definition guarantees a distinct physical identity for every PE up to multiple planes of clusters. In FIG. 1D, the PE-yz Data Output goes to the multiplexer 20 and the data outputs 12 from the other PEs in the local cluster also go to multiplexer 20. The PE-yz data output 12 also goes to the other PEs in the cluster. This is indicated by the FROM Local Cluster groupings of PE data paths where the apostrophe (') indicates that the binary value is complemented.

Figures 8A, 8B:
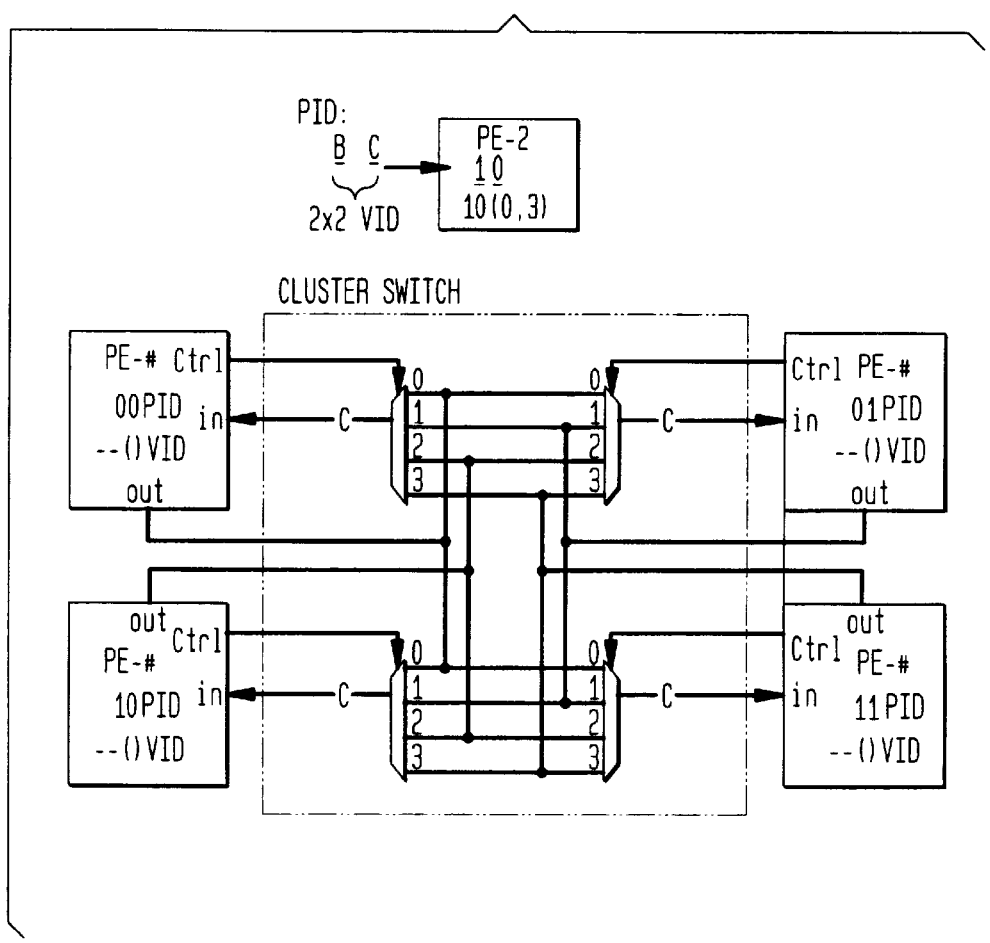
FIG. 8A illustrates a PEXCHG instruction that initiates a PE-to-PE communication operation.
FIGS. 8B, 8C and 8D illustrate cluster switch diagrams.
Figure 8C:
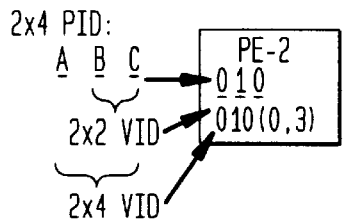
Figure 8C:
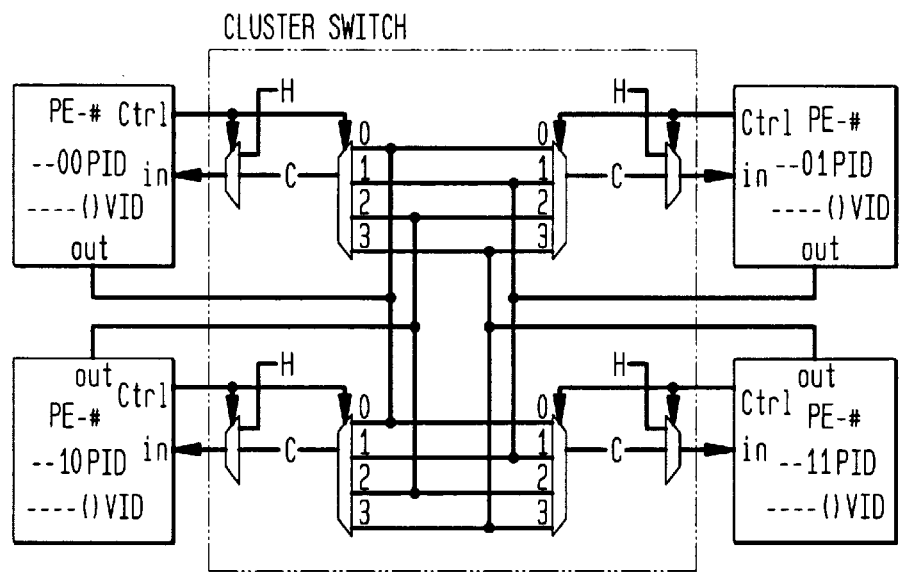
Figure 8D:
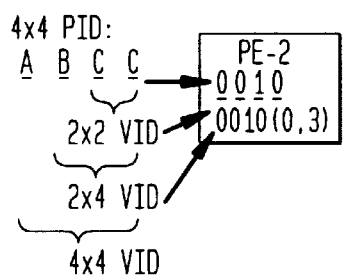
Figure 8D:
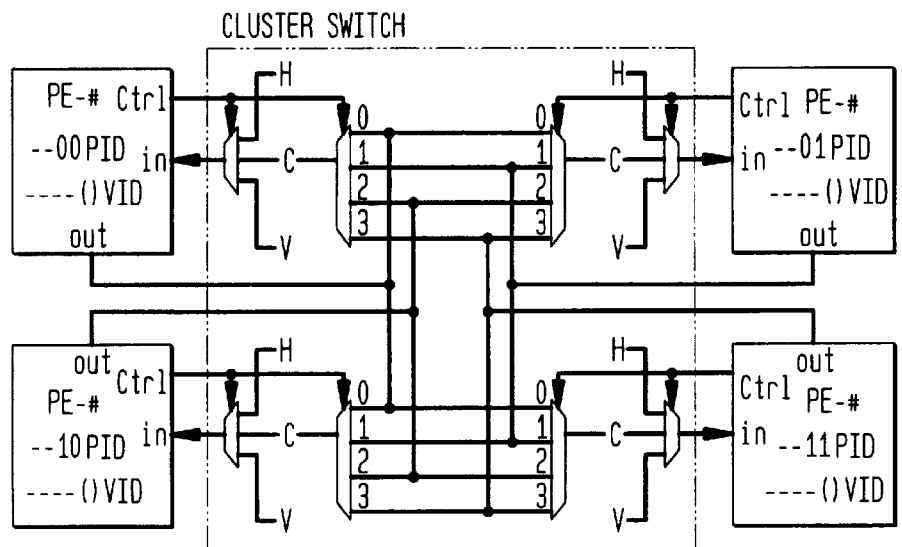

The output of multiplexer 20 goes directly to the PE data input 14. This multiplexer configuration is repeated for each PE in the 2×2 cluster, as shown in FIG. 8D. Consequently, when data is made available by a PE during the execution of a communication instruction, the data becomes present at one input of each of the four multiplexers 20 that make up the 2×2 cluster. Each PEs' control 16 selects which input on its associated cluster switch mux 20 is to be enabled to pass that input data through the mux to be received into each PE.

Figure 2:
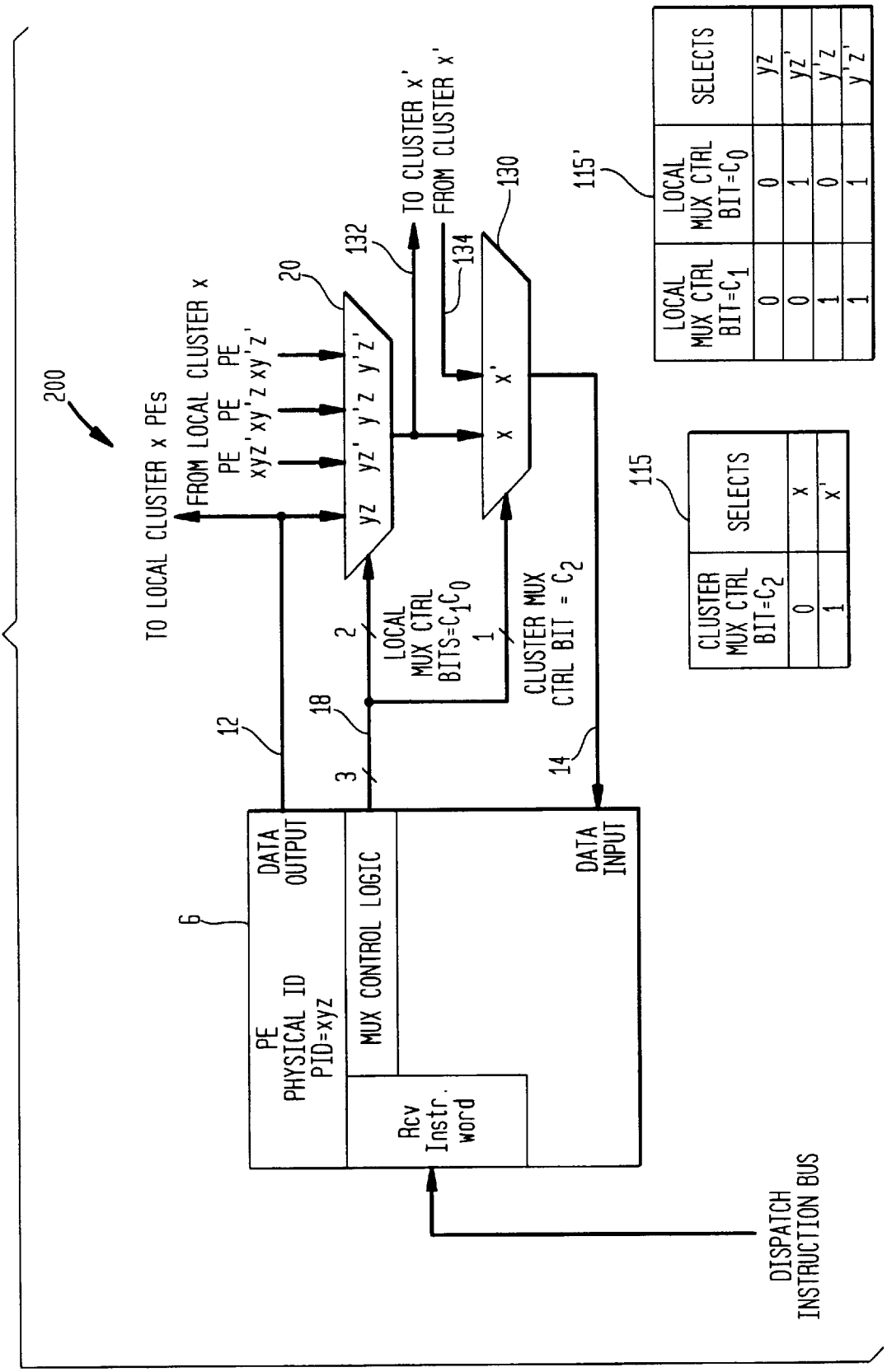
FIG. 2 illustrates the multiplexer structure for a 2×4 ManArray which contains 2×2 clusters.

FIG. 2 illustrates a multiplexer structure 200 for a 2×4 ManArray which contains two 2×2 clusters. The 2×4 structure requires the addition of another level of multiplexer 130 to be added for each PE 6. With two 2×2 clusters in a 2×4 arrangement, there is one data output interface 132 and one data input interface 134 per cluster switch multiplexer between the multiplexers in the two clusters, a shown in FIG. 12A. The number of control lines grows from 2 lines to 3 lines 18 where 2 control bits (Local Mux Ctrl Bits $C_1, C_0$) go to multiplexer 20 for selection of a local cluster PE path and I control bit (Cluster Mux Ctrl Bit $C_2$) goes to the multiplexer 130 for selection of a local cluster PE path or the second cluster path. The Mux Ctrl Bit values and the data paths selected are shown in the accompanying tables 115 and 115'in FIG. 2.

Figure 3:
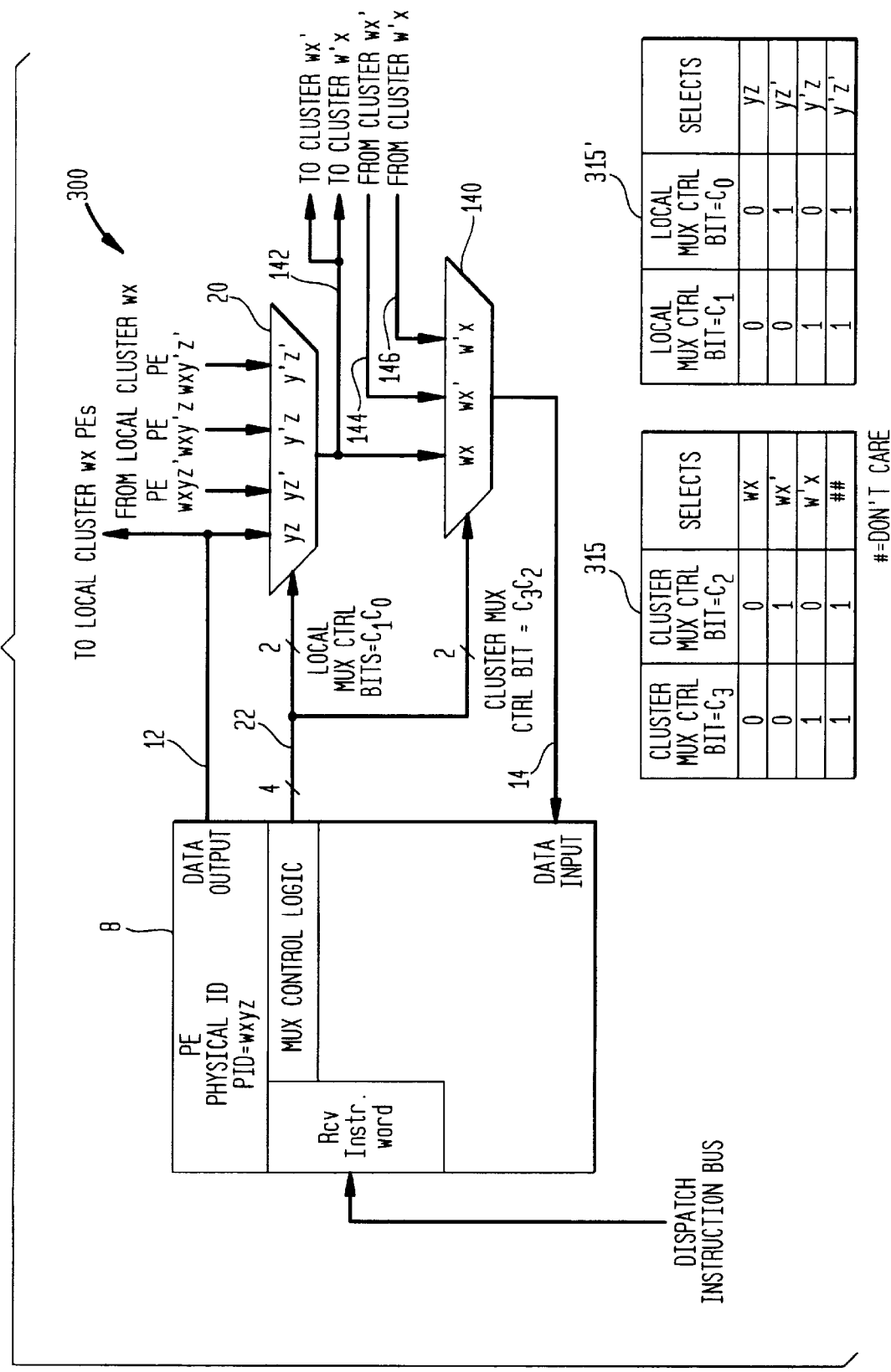
FIG. 3 illustrates the multiplexer structure for a 4×4 ManArray which contains four 2×2 clusters.
Figure 21:
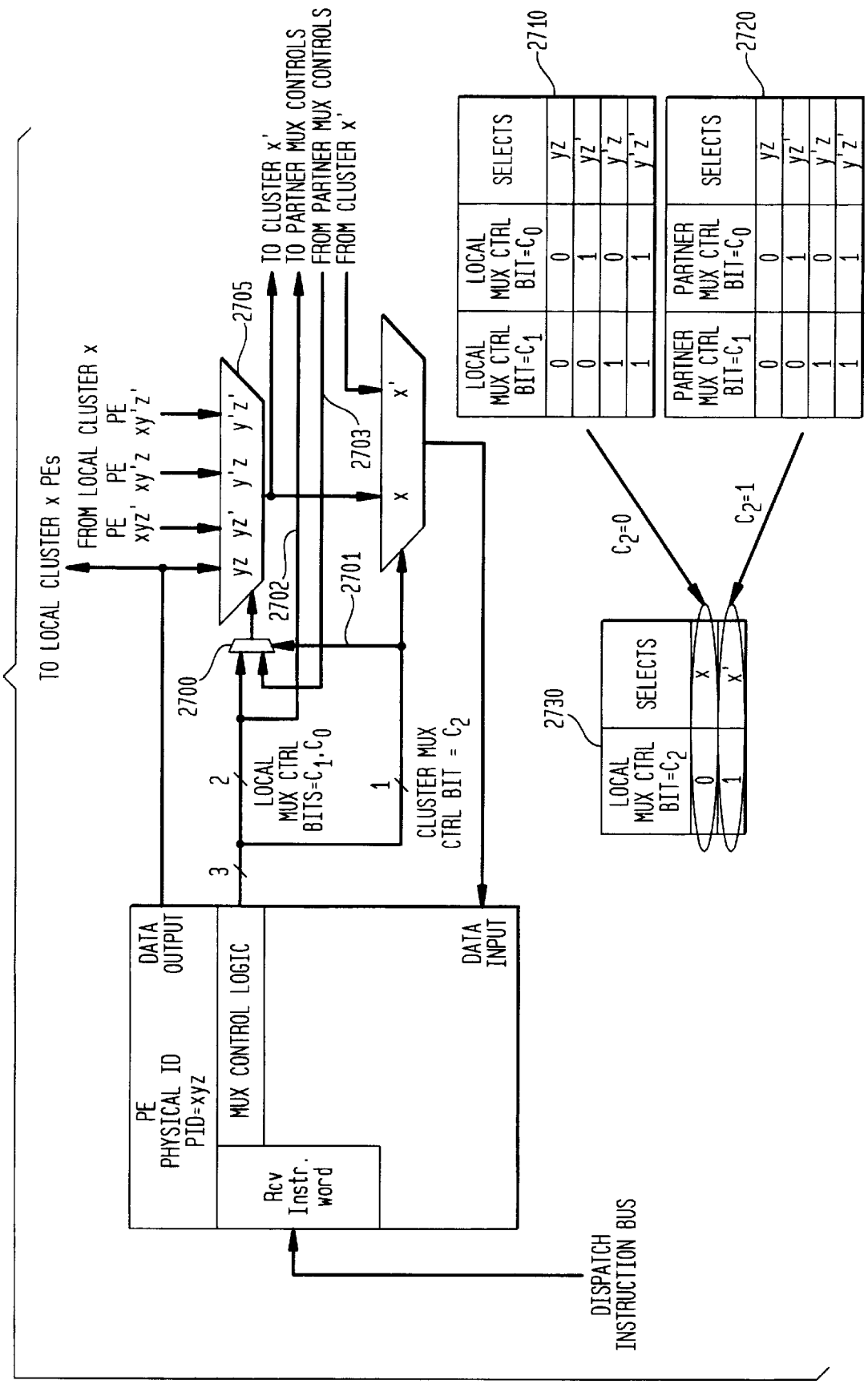
FIG. 21 shows an extension to the Cluster Mux Controls that allows an adjacent cluster's partner PE to control the selection of any PE in the local PE's cluster.

FIG. 3 illustrates a multiplexer structure 300 for a 4×4 ManArray which contains four 2×2 clusters. This 4×4 arrangement requires the same number of levels of multiplexing as was used in the 2×4, but the second level of multiplexing provided by multiplexer 140 adds a second input path. With four 2×2 clusters in a 4×4 arrangement, there is a common single data output interface 142 per cluster switch multiplexer that goes to two orthogonal clusters wx' and w'x. There are two data input interfaces 144 and 146 per cluster switch multiplexer that receives incoming data from the orthogonal clusters' multiplexers. The paths between the cluster switch multiplexers are shown in FIG. 21. The number of control lines grows from 3 lines to 4 lines 22 where 2 control bits (Local Mux Ctrl Bits $C_1, C_0$) go to multiplexer 20 for selection of a local cluster PE path and 2 control bits (Cluster Mux Ctrl Bits $C_3 C_2$) go to multiplexer 140 for selection of either a local cluster PE path or one of the two orthogonal cluster paths. The Mux Ctrl Bit values and the data paths selected are shown in the accompanying tables 315 and 315' in FIG. 3.

Figure 4:
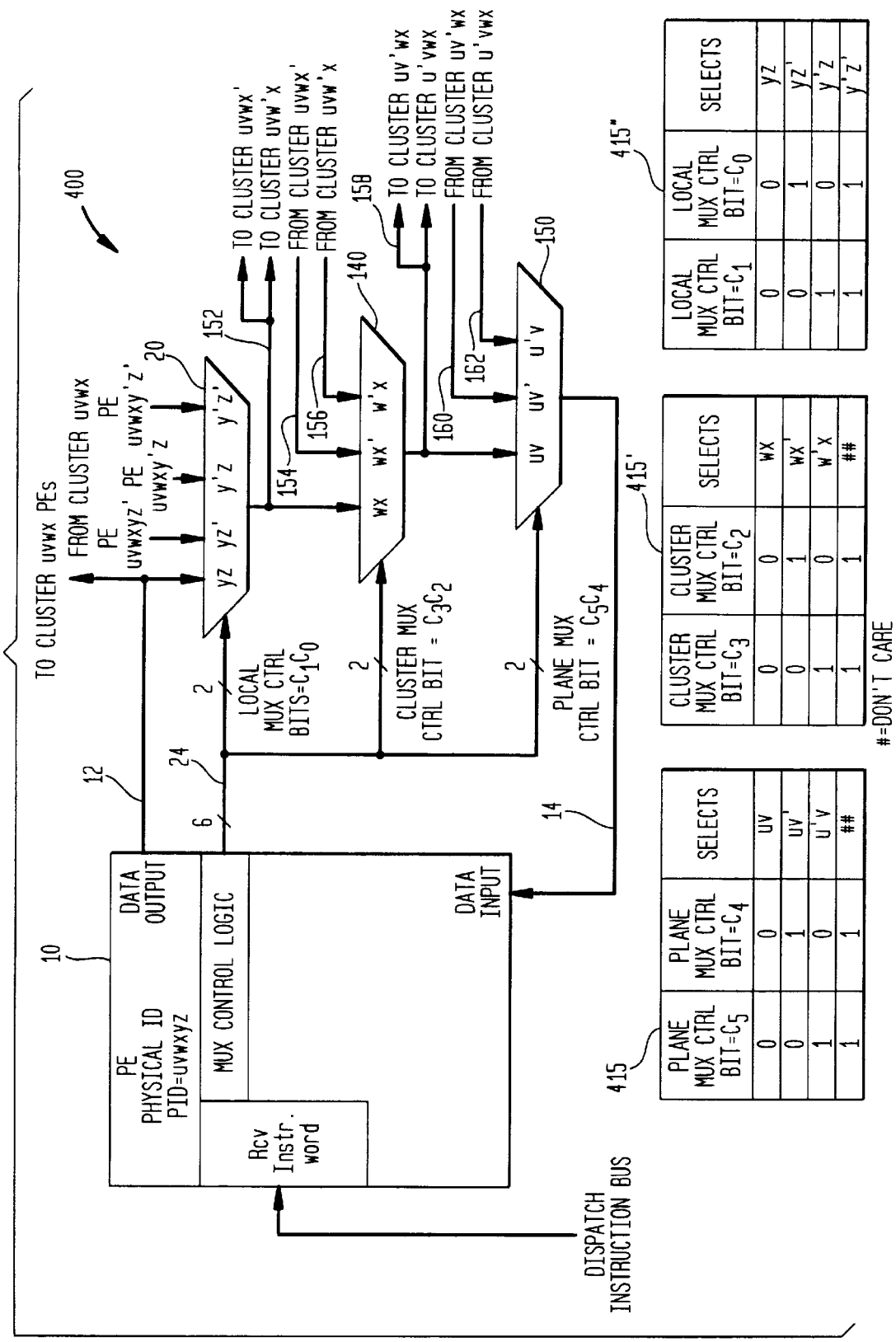
FIG. 4 illustrates the extension of the ManArray cluster switch to a 4×4×4 topology of 16 2×2 clusters containing a total of 64 PEs.

FIG. 4 illustrates the extension of the ManArray cluster switch to a 4×4×4 topology 400 of 16 2×2 clusters containing a total of 64 PEs. Another level of multiplexing 150 is required for this arrangement. For this organization, there is a common single data output interface 152 per cluster switch multiplexer that goes to two orthogonal clusters uvwx' and uvw'x. There are two data input interfaces 154 and 156 per cluster switch multiplexer that receives incoming data from the orthogonal clusters' multiplexers. There is a common single data output interface 158 per cluster switch multiplexer that goes to two orthogonal planes uv'wx and u'vwx. In addition, there are two data input interfaces 160 and 162 per cluster switch multiplexer that receives incoming data from the orthogonal planes. The number of control lines grows from 4 lines to 6 lines 24 where 2 control bits (Local Mux Ctrl Bits $C_1, C_0$) go to multiplexer 20 for selection of a local cluster PE path, 2 control bits (Cluster Mux Ctrl Bits $C_3 C_2$) go to multiplexer 140 for selection of a local cluster PE path or one of the orthogonal cluster paths, and 2 control bits (Plane Mux Ctrl Bits $C_5 C_4$) go to multiplexer 150 for selection of the input path from the local plane or one of the orthogonal planes. The Mux Ctrl Bit values and the data paths selected are shown in the accompanying tables 415, 415' and 415" in FIG. 4.

SCALABLE CLUSTER SWITCH CONTROL LOGIC

The input-to-output transformation from a received Dispatched Communication Instruction (one of the inputs) to the Cluster Switch multiplexer control bits (the output) is described next. Four transformation methods and apparatus are described. In these transformation methods, a Receive Instruction refers to the communications instructions known as a PE Exchange Instruction (PEXCHG), a SP Receive Instruction (SPRECV), or a SP Send Broadcast Instruction (SPSEND) which will preferably be included in the ManArray Instruction Set Architecture.

Figure 5:
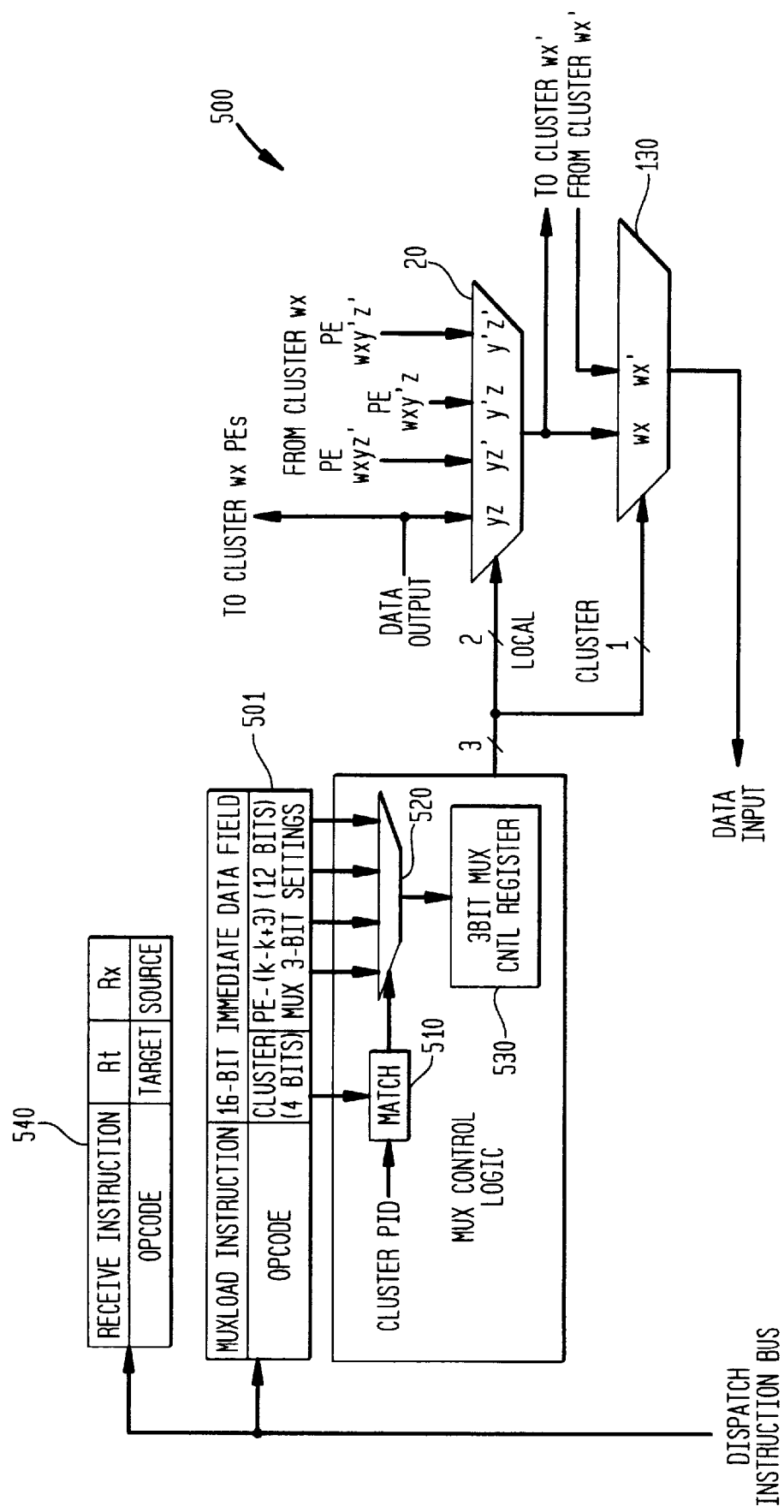
FIG. 5 illustrates a register mode control for a 2×4 PE receive multiplexer.

The first transformation method, the Register Control Method, requires multiple cycles for any communication operations that change the state of the cluster switch controls from a previous setting. The apparatus used requires a multiplexer control state to be loaded first and, then, whenever a Receive Instruction is dispatched, the actual transference of data occurs. A register mode control arrangement 500 is depicted in FIG. 5 for a 2×4 system where a Mux Load Instruction 501 is used to load up to four PEs at a time with their Cluster Switch Multiplexer control bits. The Mux Load Instruction 501 consists of an opcode portion and a 16-bit immediate data field that consists of the 4-bit Cluster specification and four PEs' 3-bit mux control state bits. The controller SP dispatches the Mux Load Instruction to all PEs, each of which uses the Cluster field to compare with the local PE's PID. If there is a match 510, the specific 3-bit field associated with the local PE is selected via multiplexer 520 and loaded into a 3-bit Mux Control Register 530. The Mux 3-bit Settings 12-bit field in the Mux Load Instruction 501 is segmented into four 3-bit sub-fields associating the Least Significant bits of the 12-bit field for the first PE-k in the cluster. Each of the cluster PEs, PE k+1, k+2, and k+3 is associated with one of the other sub-fields, with k+3 being in the Most Significant 3-bit sub-field of the 12-bit Settings field. The Mux Load Instruction 501 provides Mux Control information for a single cluster of four PEs. In larger topologies made up of multiple clusters, the Mux Load Instruction would be issued once for each cluster. After the Mux Control Registers are loaded in all PEs, the Receive Instruction 540 can be dispatched to cause the required communication to occur. The Receive Instruction needs only specify the source and target register in the Register Control method. The source register is made available at the Mux 20 inputs and the data from the output of Mux 130 is loaded into the target register. This approach requires C-cycles of setup latency for a C cluster system anytime a communication operation is required where the Cluster Switch Mux controls have to be changed in each cluster.

To avoid this setup latency and have, in the preferred embodiment, a dynamic cycle-by-cycle multiplexer control, a different control mechanism is implemented. It is noted that in a SIMD mode of operation, where a single Receive Instruction is dispatched to all PEs, there is a one (Receive Instruction) to many (PE dependent control bits) mapping required to generate the multiplexer controls and, in addition, the data must be transferred between the PEs all in a single cycle. The approach depicted in FIG. 5 is not capable of single cycle control and data transfer independent of the topology of PEs. To be able to control the cluster switch multiplexers on a cycle-by-cycle basis requires that the Receive Instruction contain sufficient information that can be combined with the PE identity if necessary, to control the multiplexers and specify both the source and target registers. Three methods and apparatus are discussed below for implementing this single cycle cluster switch control method.

Figure 6:
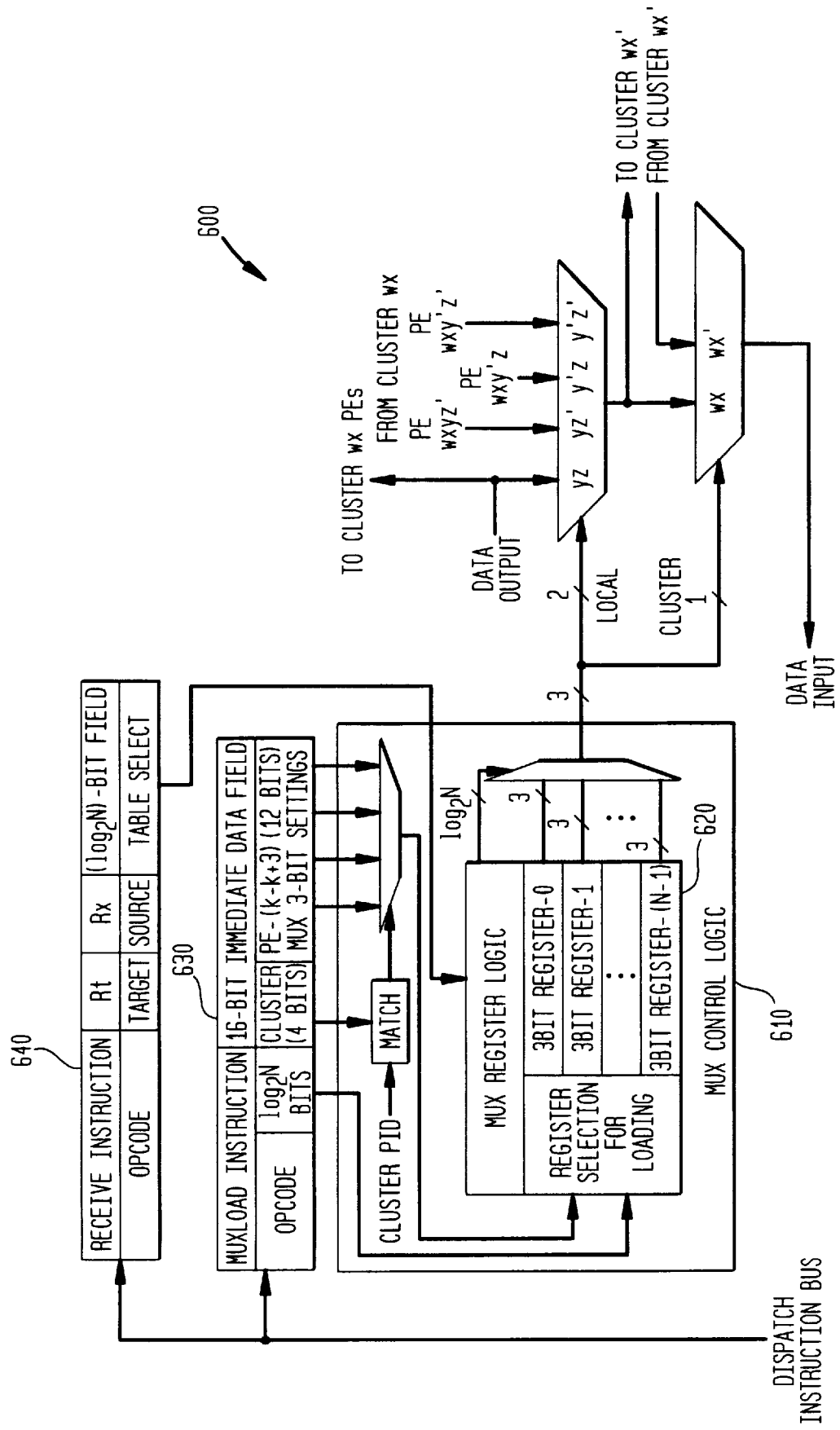
FIG. 6 illustrates a register table method for the 2×4 PE receive multiplexer.

The first method to be discussed uses the apparatus 600 shown in FIG. 6 for use with a 2×4 Register Table Method, where Mux control logic 610 includes multiple registers 620, of the type of register 530 that is shown in FIG. 5. The Mux Load Instruction 630 is expanded to include $Log_2N$ bits in the instruction format to specify which of the N 3-bit Mux Control Registers 620 is to be loaded by the instruction. For the 2×4, the total number of bits required to be stored is N*3 per PE. For a 4×4, the number of control bits grows to 4-bits instead of 3 with a consequent increase in overall storage requirements. In a single cycle, four PEs in a 2×2 cluster can each have one of N registers loaded. As in the Register Mode Control Method of FIG. 5, the appropriate 3-bit sub-field of the Mux 3-bit Settings field is selected dependent upon the PEs PID. To load all N registers in each of the C clusters requires C*N set up cycles. Once the Mux Control registers have been loaded, the Receive Instruction 640 can easily select which Mux Control Register is to specify the Cluster Switch Mux controls on a cycle-by-cycle basis by using a Table Select field in the Receive Instruction. The table select field specifies which Mux Control register to use for the cycle the Receive Instruction executes in. Assuming all Cluster Switch control possibilities required by an application are covered by the N loaded registers 620, the registers will not need to be loaded again making their setup a one time latency. Even though this is the case, the values stored in the Mux Control Registers 620 represent context specific information that a programmer must specify, save on context switches, and keep track of the contents. In addition, the values stored must be different in each PE since the control of the cluster switches is dependent upon the PEs position in the topology.

Figure 7:
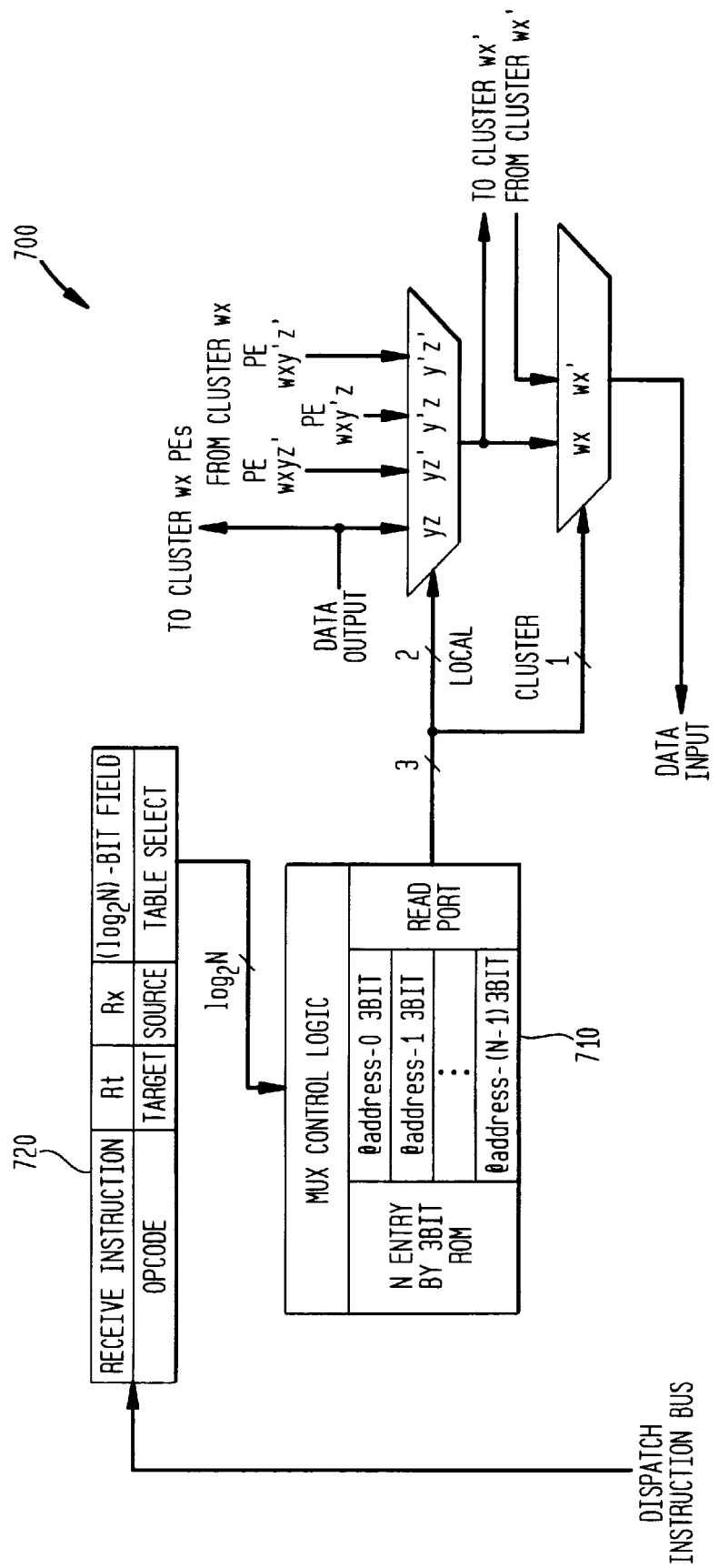
FIG. 7 illustrates a ROM table method for the 2×4 PE receive multiplexer.

Given these restrictions, an alternate method is described which does not require this state information to be saved, remembered, and calculated by the application programmer. FIG. 7 shows one example of this alternate mechanism, an apparatus 700 for a ROM Table Method for a 2×4 PE receive multiplexer. In this approach, the contents of the Mux Control Registers are precalculated at the manufacturing site and stored in a read only memory (ROM) 710. Each addressable ROM location corresponds to the register values that could have been stored in the Register Table Method of FIG. 6. In the ROM Table method, all latency associated with loading the Registers is removed. No Mux Load instruction is required. The Receive Instruction 720 is of the same type used in the Register Table Method, with the Table Select field providing the address for the ROM Read Port. There are a number of reasons why the ROM Table approach may not be appropriate for a given implementation. For example, the ROM may cause additional process steps and may cause wiring difficulties depending upon the manufacturing process. In addition, different ROMs are required in each PE. This may or may not be significant.

Figure 9A:
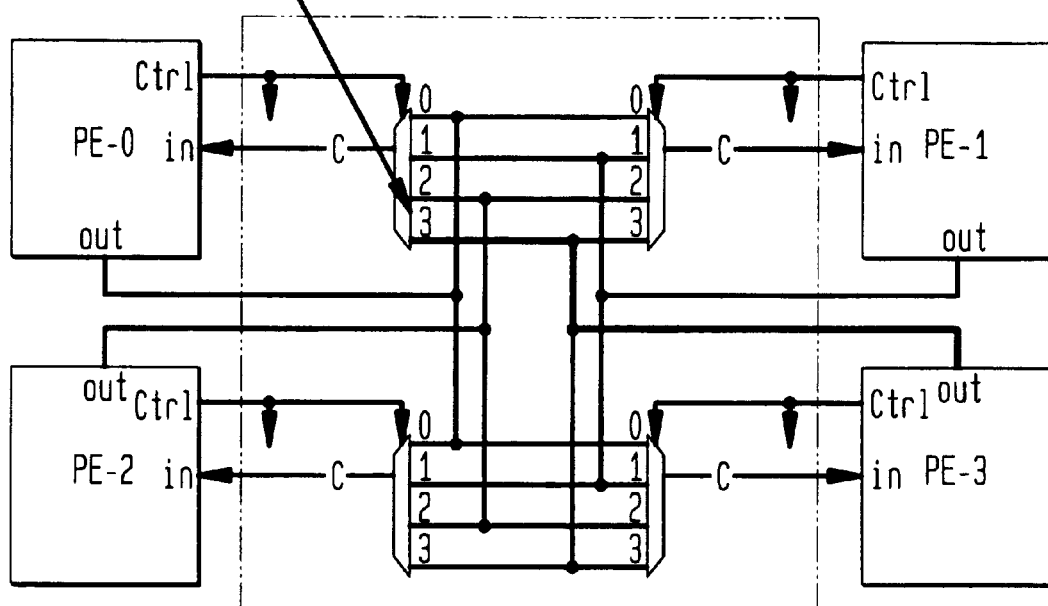
FIG. 9A shows a PEXCHG key to a 2×2 operation table.

A third approach avoids these potential problems and allows a single logic function to be used in all PEs. The underlying principle in this presently preferred embodiment is that of transforming the PE's Physical ID (PID) or Virtual ID (VID) into the cluster switch multiplexer control bits to create, for example, the communication patterns shown in FIG. 9C. The PE to PE Receive Instructions of the preferred embodiment are described first. The preferred embodiment of the instruction that initiates the PE-to-PE communication operation (PEXCHG) is shown in FIG. 8A. This instruction contains multiple fields of bits within a 32-bit instruction format to specify the operation. The source Rx and target Rt registers are specified in bits 20-11 while the Communication Operation (PeXchgSS also notated as COMOP) is specified in bits 10-3. The PeXchgSS bits specify the operation and configuration type that the operation can cause data movement within. For example, the syntax defines 2×2PeXchgSS, 2×4PeXchgSS, and 4×4PeXchgSS operation types. The specific operations are defined in the 2×2 Operation table of FIG. 9B and the 2×4 Operation table of FIG. 11B. The key to interpreting the Operation tables is shown in FIG. 9A for 2×2 operation and in FIG. 10A for 2×4 operation. Further, configuration operations are graphically shown in FIGS. 9C, 11C and 11D, respectively, where the data paths between PEs are shown and the Mux Ctrl Bits logic equation is shown. The encoding for the PeXchgSS bits is also shown in the Figures for completeness though alternative implementations may vary the encoding shown. FIGS. 8B, 8C and 8D define the labels used to identify the PEs.

As illustrated in FIGS. 8B through 8D, for example, a PE's target register receives data from its input port. The PE's source register is made available on its output port. The PE's input and output ports are connected to a cluster switch. The cluster switch is made up of multiplexers (muxes) each of which are controlled by individual PEs. The cluster switch mux control settings are specified by the PEXCHG Operations Tables. Each PE's mux control, in conjunction with its partner's mux control, determines how the specified source data is routed to the PE's input port.

Each PE also contains a 4-bit hardware Physical ID (PID) stored in a Special Purpose PID register. The 2×2 uses two bits of the PID, the 2×4 uses three bits and the 4×4, as well as the 4×4×4, use all four bits of the PID. The PID of a PE is unique and never changes.

Figure 10A:
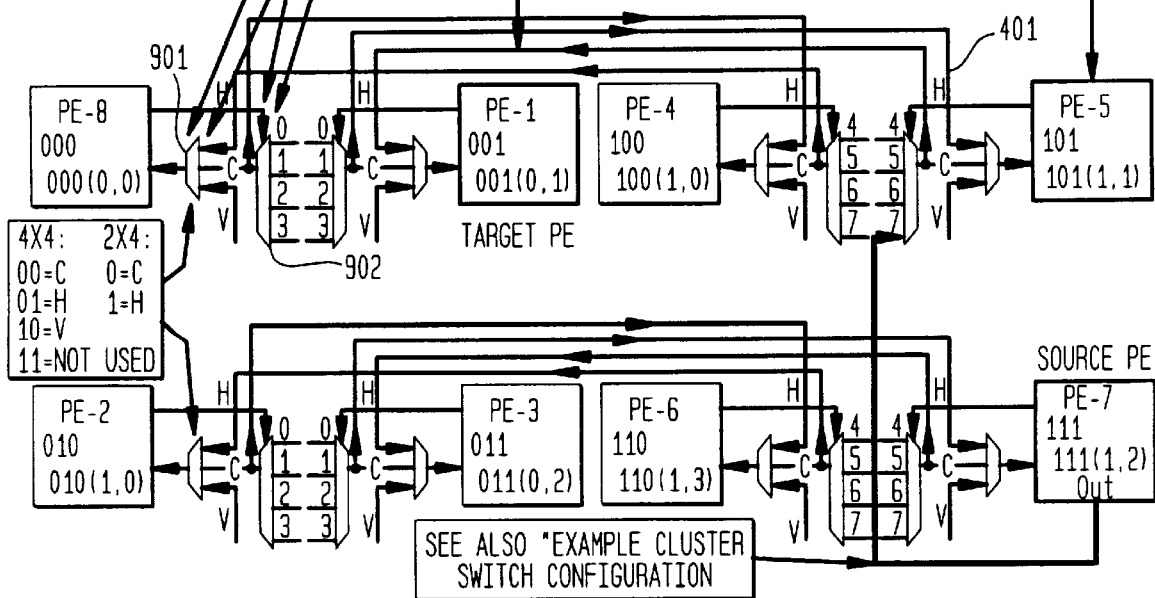
FIGS. 10A, 10B, 10C and 10D illustrate various aspects of 2×2 operation utilizing a 2×4 configured as two 2×2s.
Figures 10B, 10C:
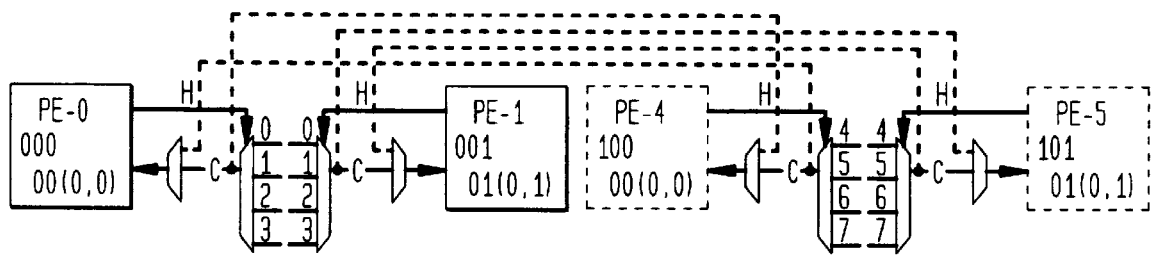
Figure 10D:
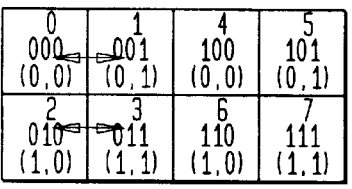

Further, each PE can take an identity associated with a virtual organization of PEs. This virtual ID (VID) consists of a Cray encoded row and column value. For the allowed virtual organization of PEs, the last 2 digits of the VID match the last 2 digits of the PID on a 2×2 as shown in FIG. 10B, and the VID and PID are the same on a 2×4 as shown in FIG. 11A. The 4×4 VID is stored in a Special Purpose VID register as a set of 2-bit fields.

FIG. 8C shows a 2×2 cluster that is part of a 2×4 ManArray with two levels of muxes per PE. For example, in FIG. 10A, muxes 901 and 902 are associated with PE-0. As shown in FIGS. 8B–8D, the specific labels within the PEs are defined. For the 2×2 and 2×4 configurations the 2×2 VID and 2×4 VID are the same as their appropriate counterparts in the PID for each PE. This is shown in FIGS. 8B and 8C, and can also be seen in FIGS. 10B and 11A. For the allowed 4×4 virtual organization of PEs, the 4×4 VIDs are different, in general, from the PEs PID. Intercluster connectivity is shown in FIGS. 11A, 12, 13, 14 and 15. The H label on the first level muxes such as 401 in FIG. 10A represents the data path between clusters. FIG. 8E describes the syntax and operation on a per PE basis.

Figure 9C:
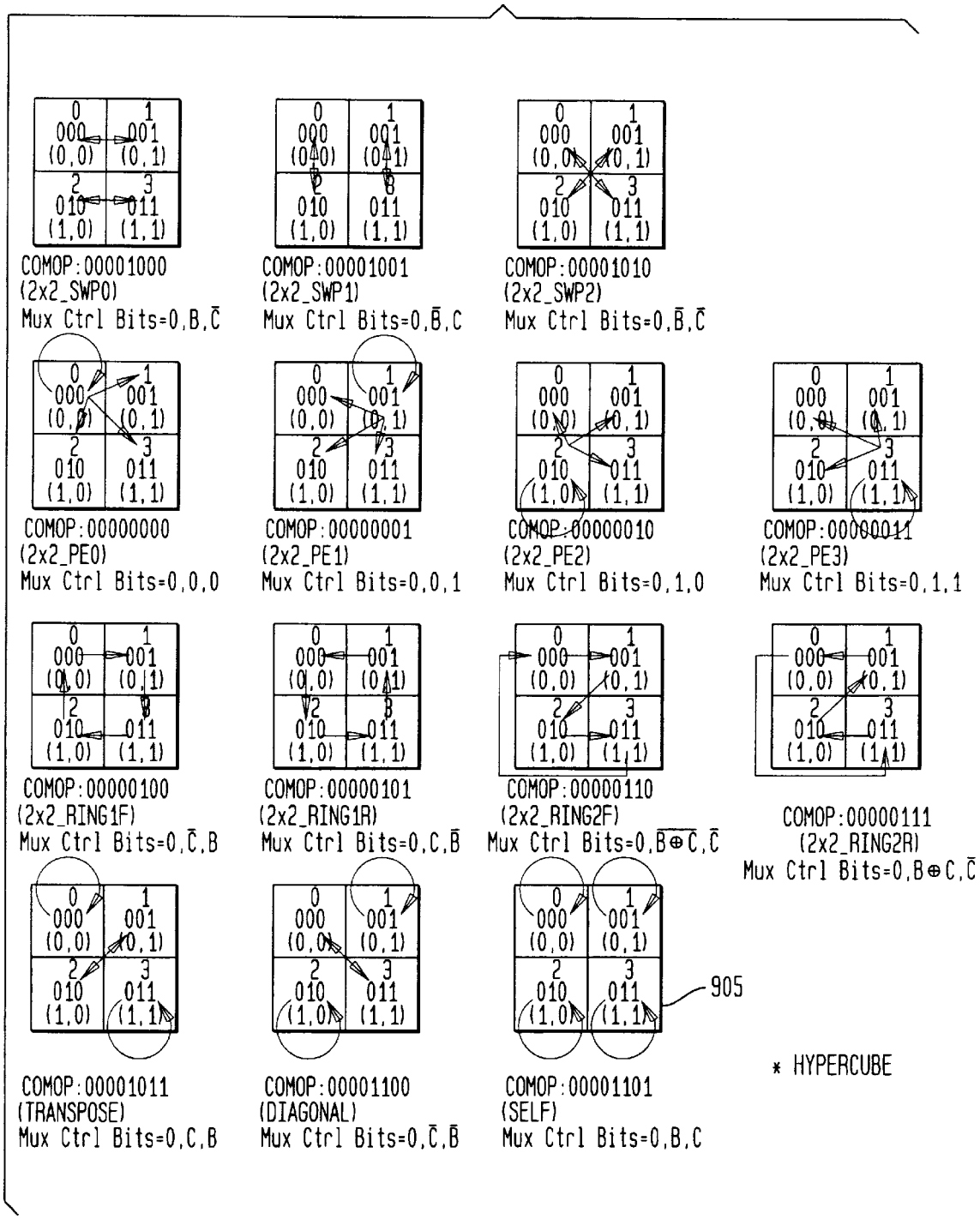
FIG. 9C illustrates aspects of 2×2 PEXCHG operations.

It is noted that the PEXCHG Self instruction, illustrated for example in FIG. 9B (904) and FIG. 9C(905), can also be used as a level of diagnostic test for verifying the first level of cluster switches. It is also noted that encoding the configuration and operation type information in the PEXCHG instruction in conjunction with the local PID and/or VID, allows PE specific control of the multiplexers which are required for synchronous MIMD operations. Other operations, such as the PE broadcast operations (FIG. 11D) are also easily encoded in a similar manner to the traditional communication directions.

Figure 15A:
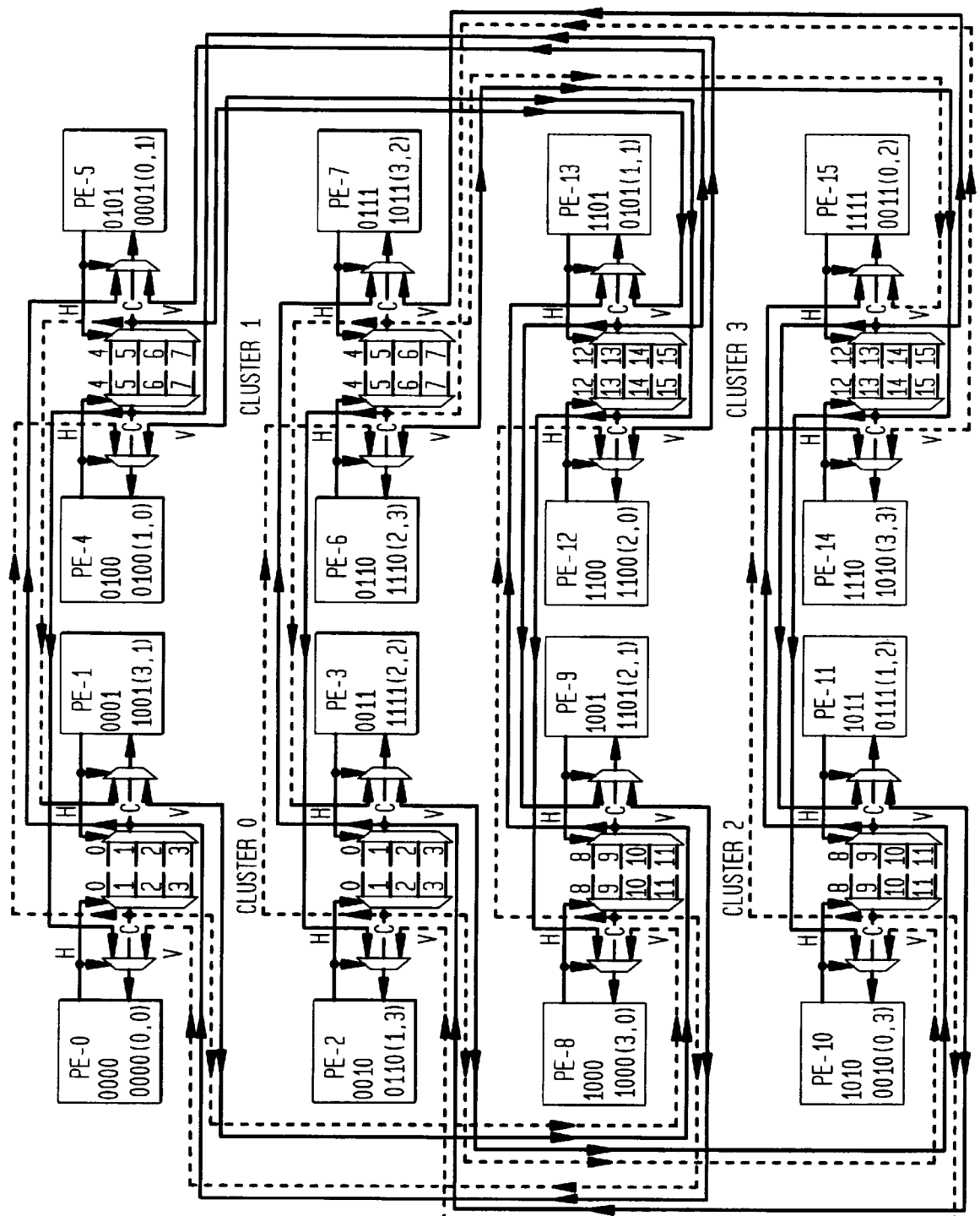
FIG. 15 illustrates a 4×4 organization of PEs.
Figure 17:
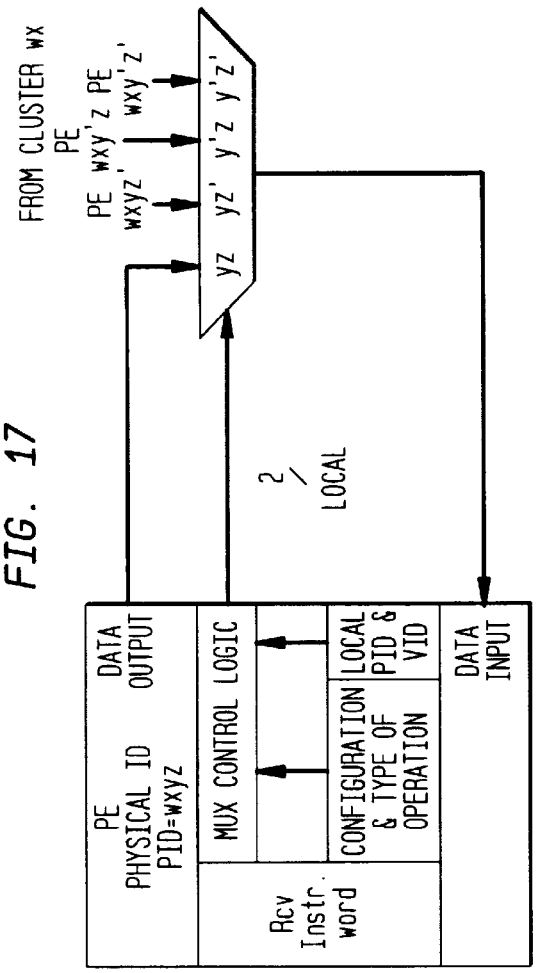
FIG. 17 illustrates a 2×2 PE receive multiplexer.
Figure 18:
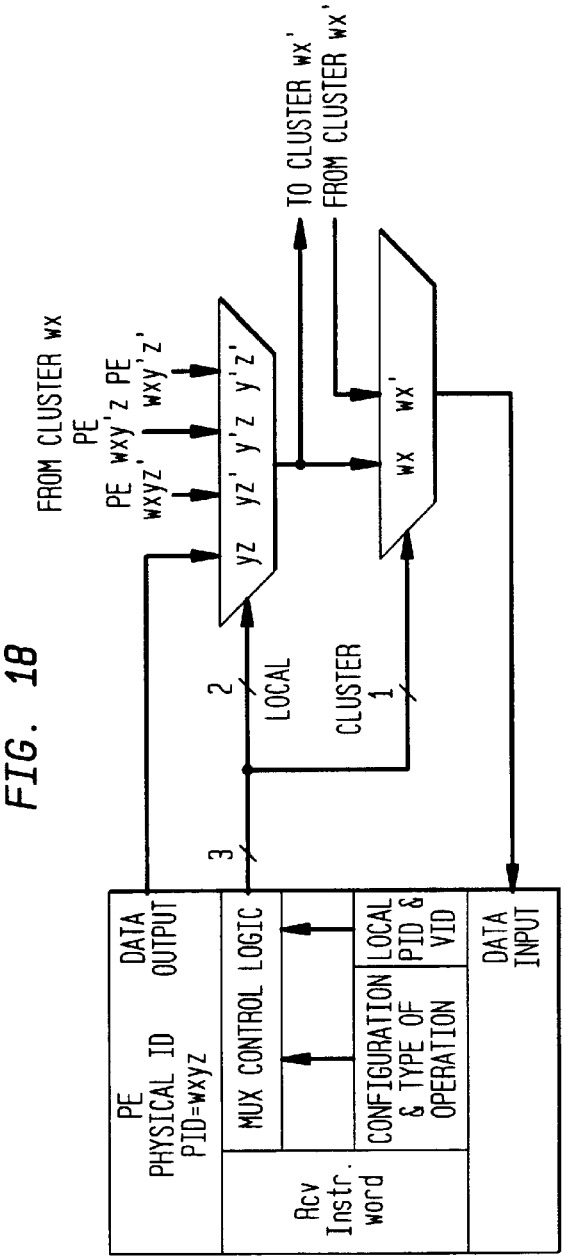
FIG. 18 illustrates 2×4 PE receive multiplexers.
Figure 19:
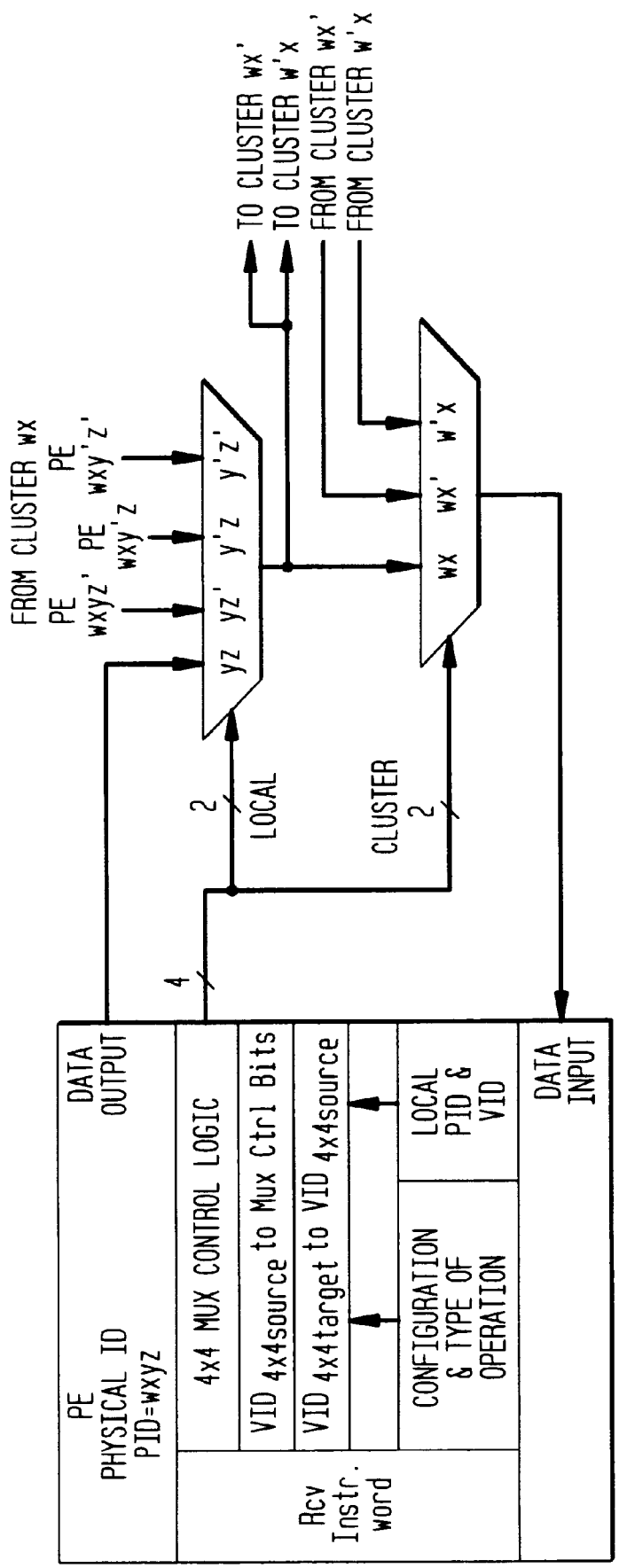
FIG. 19 illustrates 4×4 PE receive multiplexers.
Figure 20:
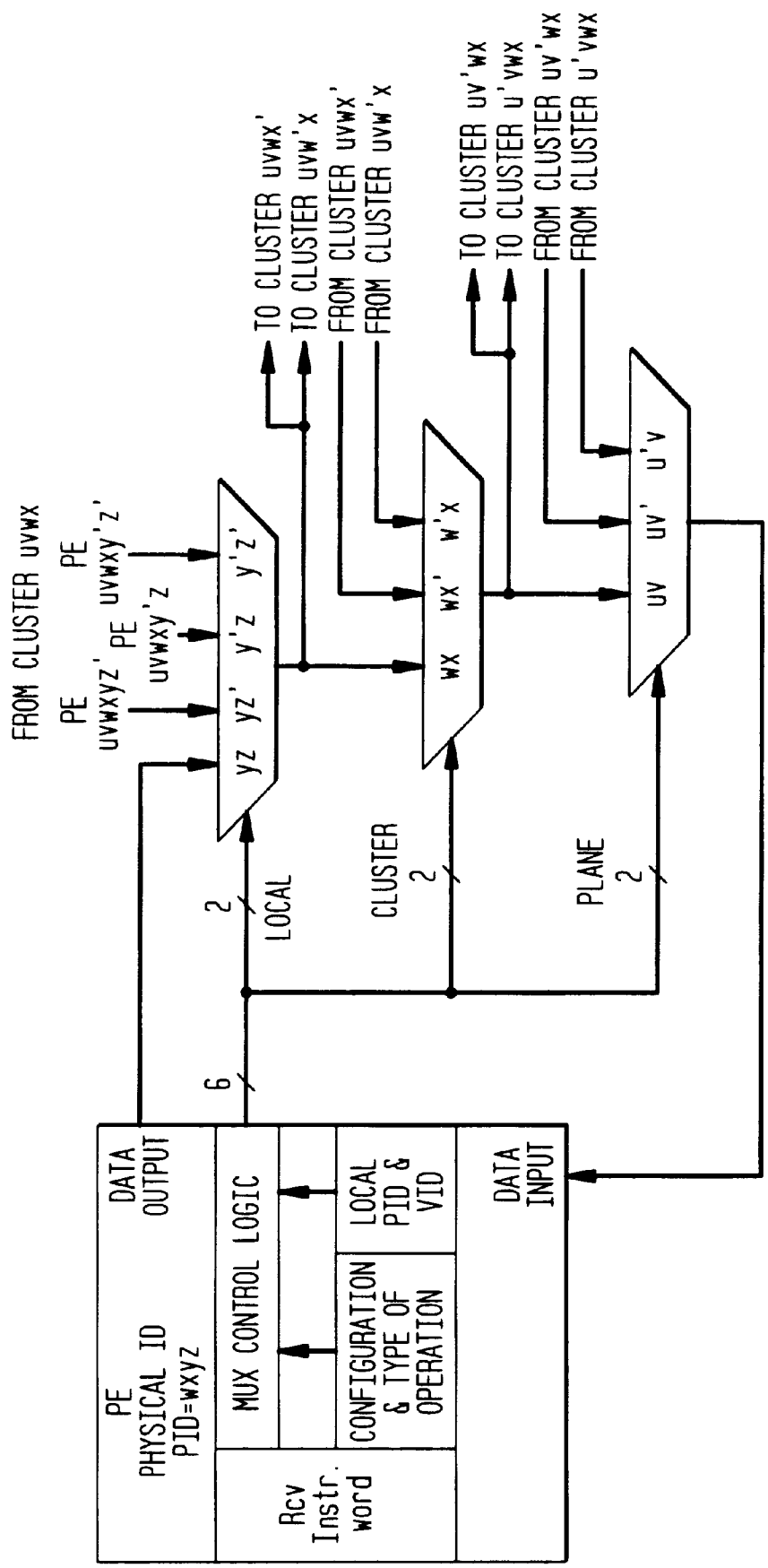
FIG. 20 illustrates 4×4×4 PE receive multiplexers.

We continue now with the description of the PE Identity Transformation apparatus of the preferred embodiment. In FIG. 8B, 2×2, and FIG. 11A, 2×4, each PE has only a single PE identity/label, namely its PID, since the Virtual IDs match the PID as indicated for the 2×2 sub clusters of FIG. 10A and the 2×4 array of FIG. 11A. For the 2×2 and 2×4 arrays, the PE's PID is transformed to the Mux control bits in each PE. Looking at the table 15 in FIG. 1D, if you map the PEs' PID to the Local Mux Ctrl bits such that $C_0=z$ and $C_1=y$, then if $PE_{PID}=PEYZ$ is to receive data from $PE_{y'z}$, $PE_{yz}$'s Local Mux Ctrl bits must set equal to $C_1'C_0=y'z$. For example, for PE yz=00 to receive from PE y'z=10 requires the Local Mux Ctrl bits to be equal to 10. In general, for up to a 4×4 ManArray as shown in FIG. 15, $PE_{PID}=PE$ wxyz represents the PE yz in cluster wx where wxyz is the binary representation of the PE address. For example, in FIG. 15: PE 6 (wxyz=0110) is located in cluster 1 (wx=01) and PE 2 (wxyz=0010) (yz=10) is in cluster 0 (wx=00). The PE label to mux control of a transformation operation is represented by a simple logical operation in each PE. This transformation in the PE that is to receive the data (target PE) takes as an input this local PE's PID (target PE's PID) and communication operation specification, and transforms the input to the source PE's PID which matches the Mux Controls for the local PE (target PE). Larger topologies follow the same basic principle, but require a different level of control since communication occurs between clusters. In FIG. 2 for the 2×4, the second mux 130 provides a selectable communication path within the cluster and between the clusters. When a between-cluster path is selected, then mux 20 provides the source PE data path to its Partner PE's cluster switch mux 130 in the attached cluster. The equations governing this transformation are shown underneath the illustrations in FIGS. 9, 10D, 11C and 11D and labeled as Mux Ctrl Bits =$C_2$, $C_1$, $C_0$ as a function of the local PEs PID (A,B,C). The first Mux Ctrl Bit position $C_2$ is the Cluster Mux Control bit. For example, in FIG. 9C, a 2×2SWP0 communication pattern is obtained by having each PE complement bit $C_0=\overline{C}$. A 2×2SWP1 communication pattern is obtained by having each PE complement bit $C_1=\overline{B}$. A 2×2SWP2 communication pattern is obtained by having each PE complement both bits $C_1=\overline{B}$ and $C_0=\overline{C}$. The complement operation is indicated by a bar over the capitalized letter, $\oplus$ indicates exclusive-OR and concatenation (BC) indicates AND.

Since it is desirable to allow multiple organizations of PEs, with many of the PEs requiring a different label, i.e. a different identity, depending upon the organization, this simple transformation is not in general sufficient. Specifically, a method and apparatus is desired that allows a given implementation, e.g. a 2×4, a 4×4, or a 4×4×4, to support communication patterns that are associated with different organizations of PEs within the given topology. Different organizations of PEs require, in general, a virtual identification for the PEs, i.e. different PE labels that depend upon the configuration a programmer desires. This requirement would seem to dictate the need for a mode control register to specify the organization of PEs that is desired. For example, four 2×2s, or two 2×4s, or a single 4×4 as three modes could be specified for a topology of 16 PEs. This mode information could then be used in conjunction with the PID and Receive Instruction to specify the control bits required per multiplexer in each of the topologies specified. Alternatively, and as part of our preferred embodiment, no mode control register is required since the configuration information is encoded in the Receive instruction. By encoding the configuration information in the Receive instruction, the PE topology can, in essence, be changed on an instruction-by-instruction cycle-by-cycle basis with no mode control set up latency ever needed.

Figure 11C:
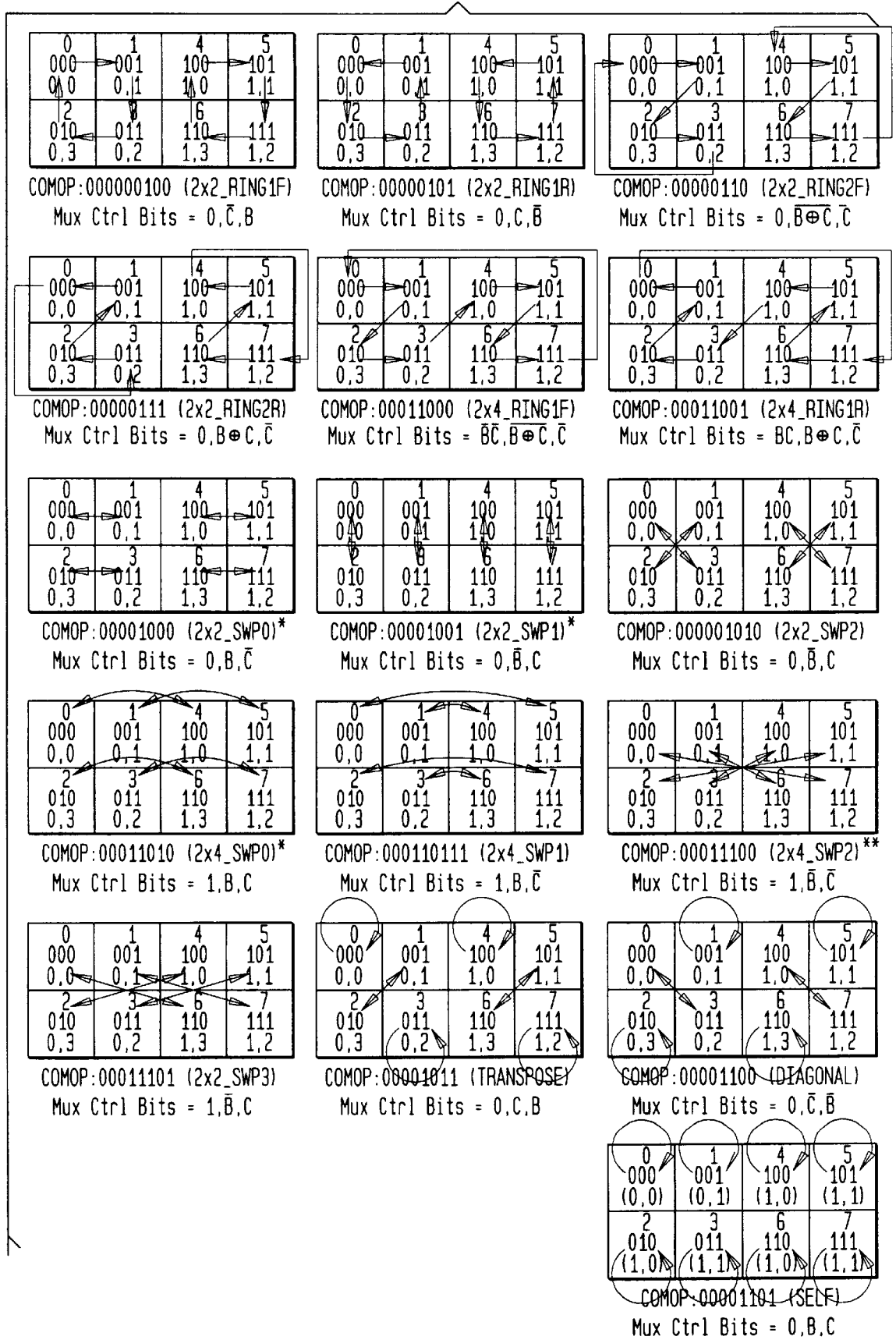
FIGS. 11C and 11D illustrate aspects of 2×4 operations and PEXCH6 operations.
Figure 12:
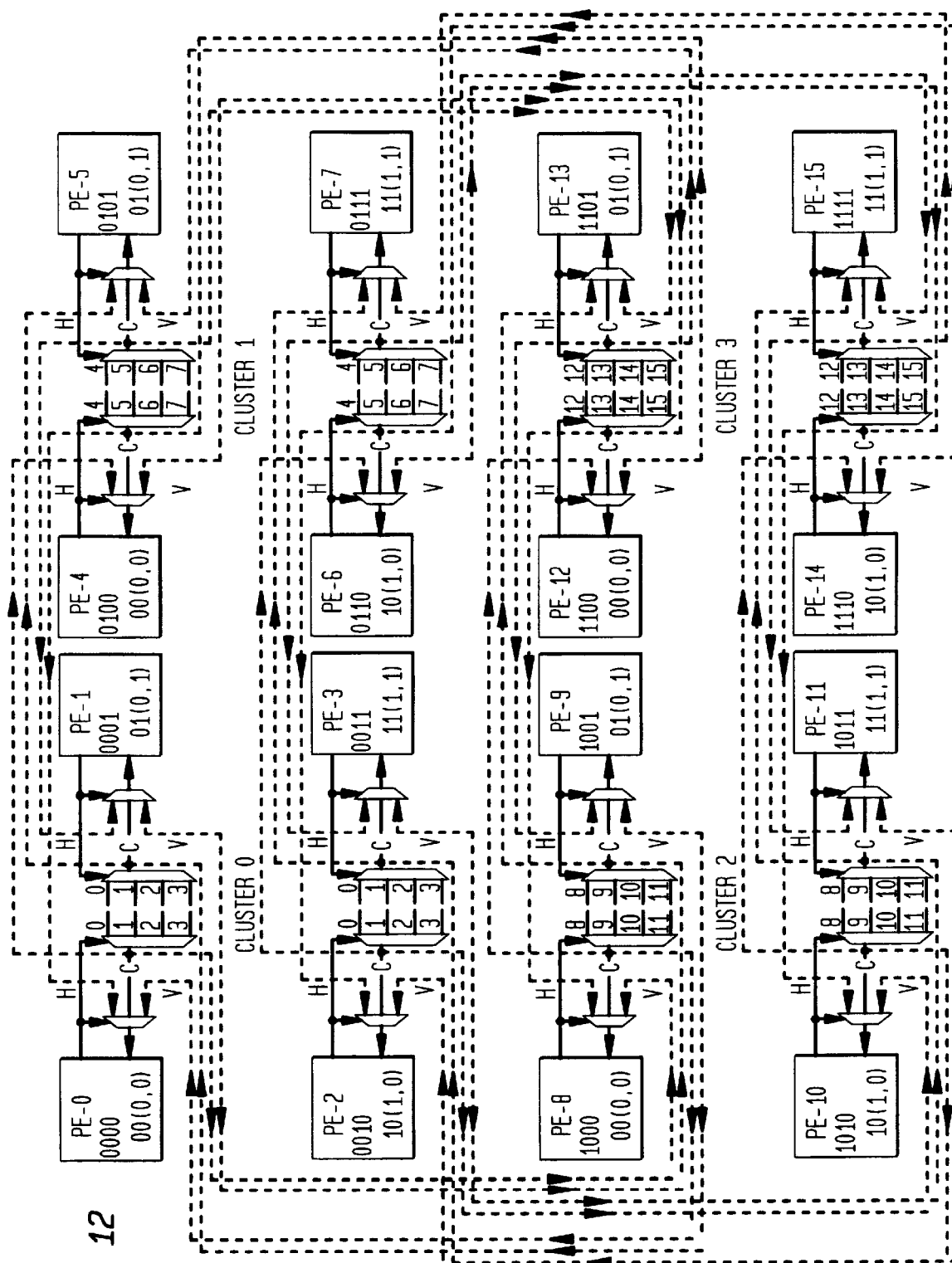
FIG. 12 illustrates a 4×4 configured as four independent 2×2s with one system processor (SP) active in each 2×2.
Figure 13:
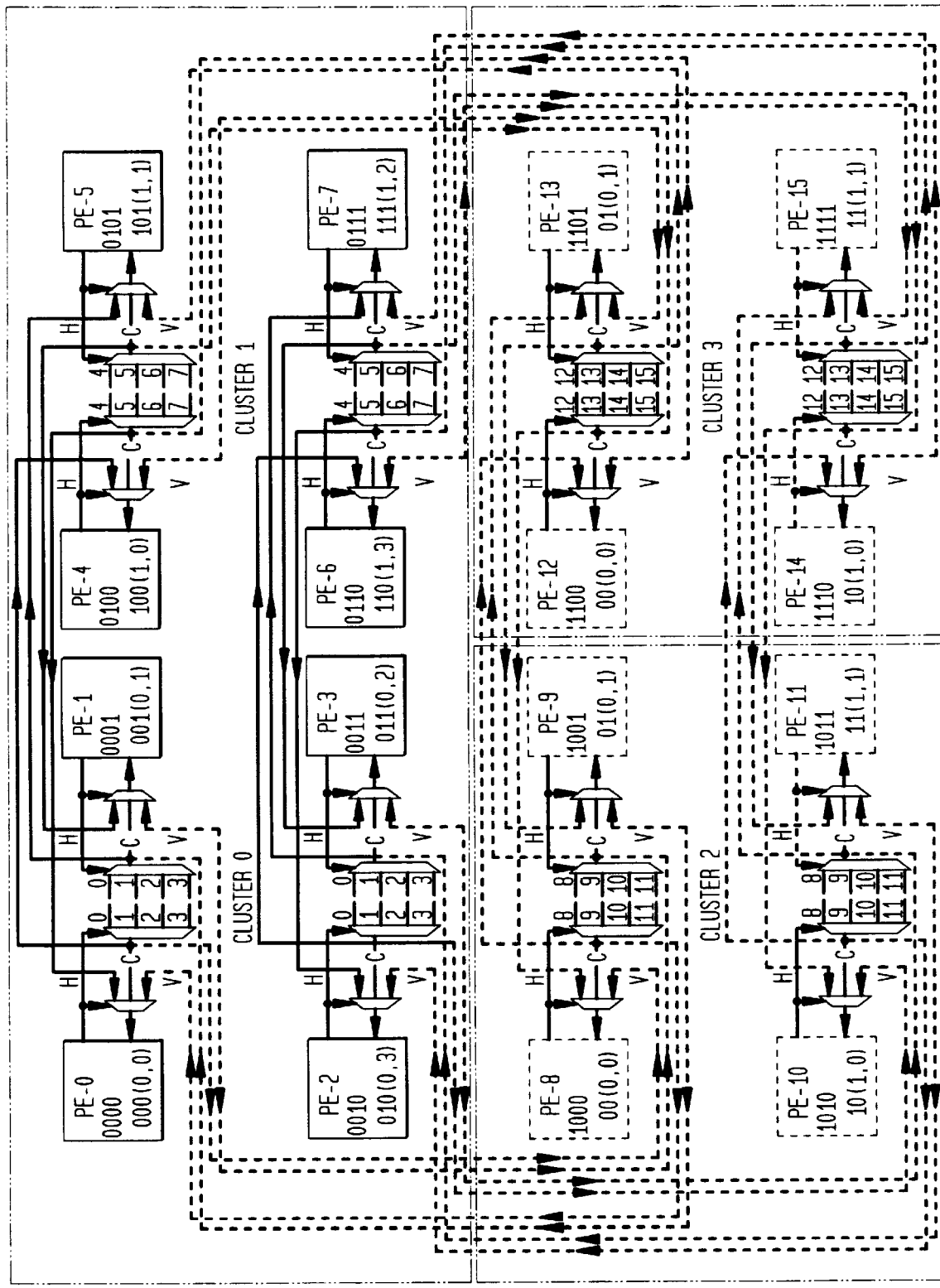
FIG. 13 illustrates a combination of a single 2×4 with clusters 0 and 1 combined, and a dual 2×2 with clusters 2 and 3 separately configured.
Figure 14:
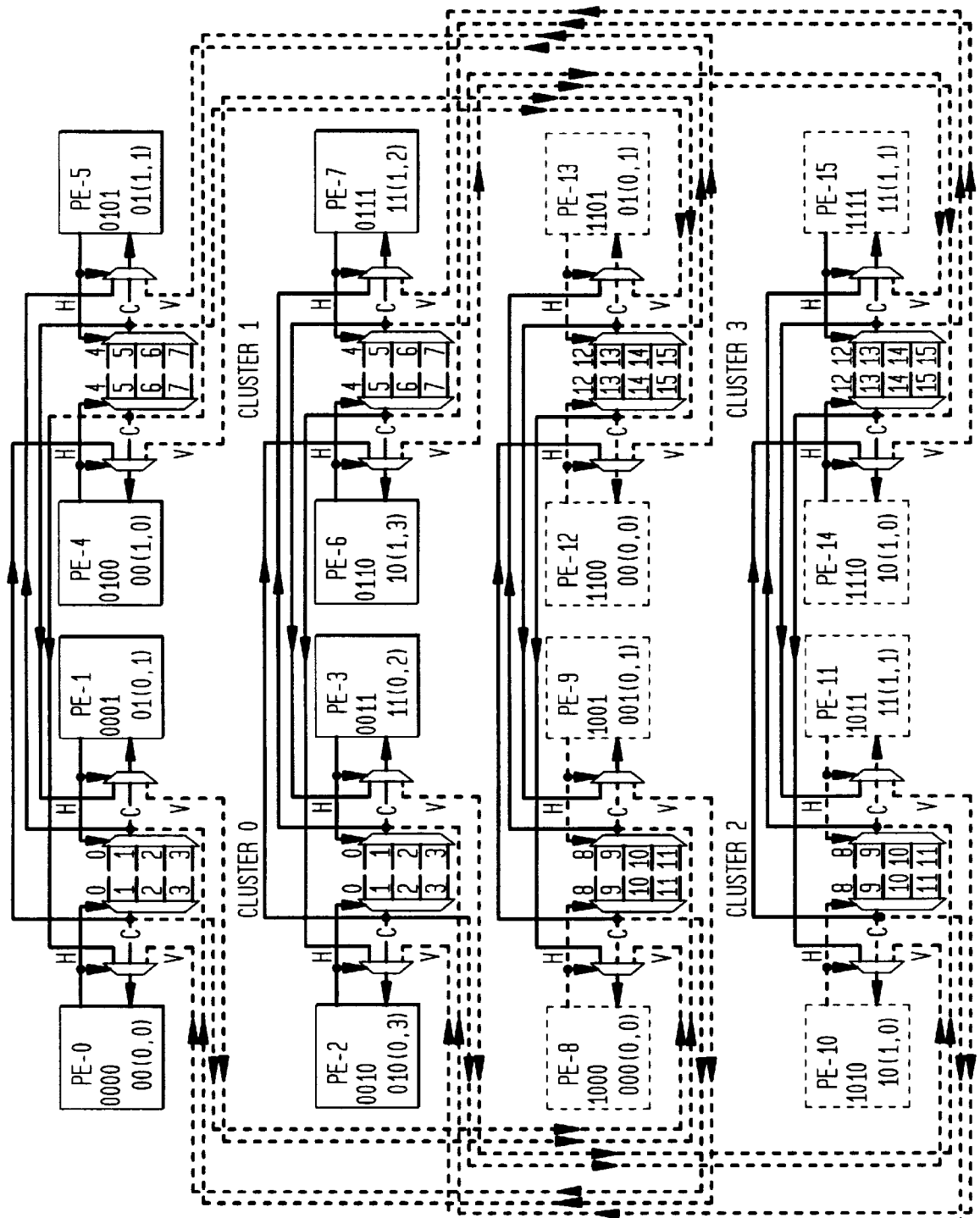
FIG. 14 illustrates a dual 2×4 organization of PEs.

In order to support multiple virtual organizations of PEs within the same ManArray physical organization, it is required that the PE label be treated as a variable that can be specified in some manner by a programmer. If the number of organizations of PEs that are supported is a small number, then the PE label can be explicitly stored in a separate register as input to the control mechanism. For FIGS. 8B and 11A, the 2×2 and 2×4 VIDs are the same as their counterpart bits in the local PE's PID. For the 4×4 case, even though only one Virtual organization of 16 PEs is planned other virtual organizations are feasible and it is noted that the VIDs≠PIDs in general. It is noted from the previous discussions that the type of communication operation for a specified configuration can be dynamically conveyed in the Receive instruction itself. For the 4×4, the combining of this Receive information with the VID in each PE creates the multiplexer controls. It is important to note that the programmer could view the organization of PEs not necessarily as their physical IDs (PIDs) or Virtual IDs would place them, but rather in their logical configuration with additional data path connectivity. Logical configurations are the classical torus, mesh, or hypercube visualizations. Specifically, PEs are known or identified by their labels and in any organization of PEs, for example a 4×4, each operational PE must be uniquely identified. Each PE's Physical ID label provides a necessary unique identification. This unique placement may not match the needs of torus, hypercube, or other typical topologies. In the ManArray with its rich interconnection network, the PEs can be placed within the physical ManArray organization in positions different than the physical ID placement would seem to indicate and still maintain many virtual organizations' logical communication paths. The new placement or placements are accomplished by using a Virtual ID label. The PEs in the virtual organization, i.e. Virtual PEs, obtain new PE-to-PE data paths that are not normally there in a placement where the logical organization matches more closely the physical organization. Consequently, the virtual configuration is important to the programmer because the virtual configuration is chosen to minimize the PE-to-PE communication latency when executing an algorithm. Based upon a specific algorithm or application, the programmer chooses a virtual configuration of PEs and then programs the data distribution pattern given this virtual configuration. Based upon the virtual configuration, the communication operations can then be specified as needed by the algorithm. The programmer can still view the topology in a logical organization with the added benefits of the new PE-to-PE data paths. In FIG. 15, the virtual PE labels are indicated for a 4×4 array as a linear ring {PE-0, 1, . . . , 15} (top row labels in PEs), or as a torus PE-row,column {PE-(0,0), (0,1), . . . , (3,3)}(bottom row labels in parentheses), or as a hypercube PE-$d_3d_2d_1d_0$ {0000, 0001, . . . , 1111} (bottom row labels in PEs). As indicated in FIGS. 8B–8D, the hypercube labels are Gray coded versions of the torus row and column labels. The PIDs are also shown in the middle row labels in the PEs in FIG. 15. In addition, the virtual labels for the allowed sub-topologies of four 2×2s, two 2×2s and one 2×4, and two 2×4s are shown in FIGS. 12, 13 and 14, respectively. In general, it can be stated that there is a Virtual Identity or VID for each PE representing the PEs position in any virtual topology allowed by an implementation, that is invoked by the information conveyed in the Receive Instruction. In the same manner as the 2×2 and 2×4 configurations' PID-to-Multiplexer-control-bits transformation, the VID can be transformed into the multiplexer control bits. It can be further stated that this transformation can be logically viewed as a two step process where in the first step, the Target PE's VID is transformed into the Source PE's VID. In the second step, the Source VID is transformed into the Multiplexer Control bits. In the second step, the physical receive-data-path selected is the path to the source physical PE which is also referenced by its Source VID. This is shown, by way of example, using the 4×4 topology as shown in FIG. 15 for the 4×4 transpose operation shown in FIG. 16. The transform operation on the 4×4 given the virtual placement of PEs shown in FIG. 15 is described below. The first step is to transform the target PE's VID to the Source PE's VID. For example, in a 4×4 transpose operation as illustrated in FIG. 16, PE-9 (PID=1001 and VID=(2,1)=1101) and PE-11 (PID=1011 and VID=(1,2)=0111) should exchange data as part of the 4×4 transpose operation. Using the Key for PERECV Operations Tables shown in FIG. 10A, it is noted in box 903 that for a 4×4 the $PID_{4\times4}$=ABCD and the $VID_{4\times4}$=EFGH. By way of extension, the Mux Ctrl $Bits_{4\times4}$=H/C/V(a 2 bit field), Local Cluster PE (a 2 bit field). For a 4×4 Transform, the permutation operation P that is used on each of the PEs' VIDs is P(EFGH$_{target\ PE\ VID}$)= GEF$_{Source\ PE\ VID}$. Therefore, in the first step for PE-9 its VID=1101 is transformed to the Source PE it is to receive data from as Source PE's VID=0111. In PE-11, its VID= 0111 is transformed to the Source PE it is to receive data from as Source PE's VID=1101. It is noted that this is the correct path in the virtual organization that needs to be specified for PE-9 (2,1) to communicate with PE-11 (1,2) for the 4×4 transpose operation. It is also noted that the transformed Source VIDs do not match the Physical IDs of either PE-9 or 11. Therefore, a second step is required in which the transformed Source PEs' VIDs are further transformed to the Multiplexer Control Bits. For the example with PE-9 and 11, the second step is that PE-9 takes the 0111 and transforms it to C11 and PE-11 takes the 1101 and transforms it to C01. The C indicates the path selected is between the PEs in Cluster 2 and the last 2 bits select the Mux Ctrl Bits for the proper PEs. The 4×4 transpose communication paths using this method are shown in FIG. 16 and the MuxCtrl Bits equation is equal to (0,0,E,F).

Figure 11D:
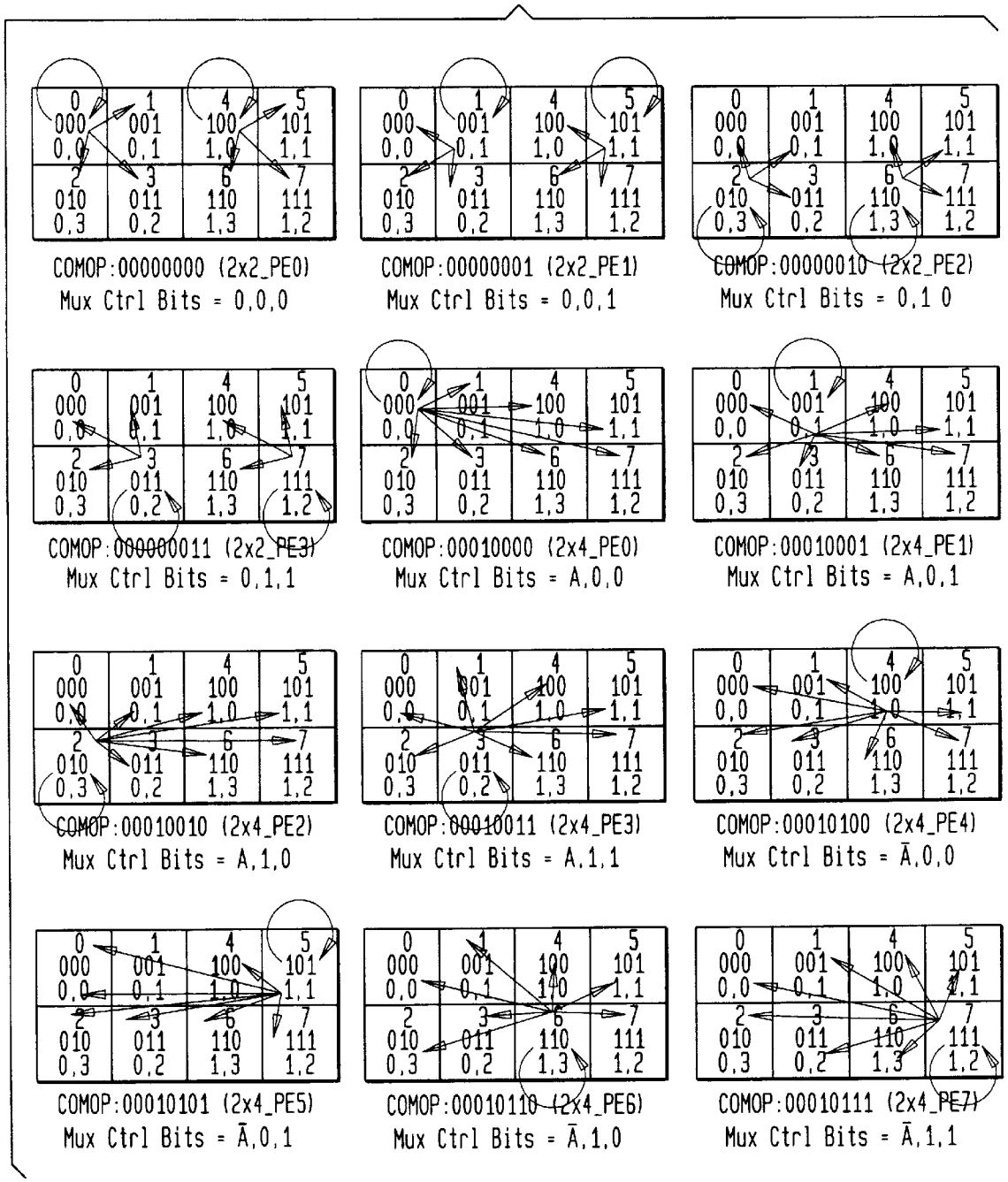

FIGS. 17 through 20 show the PE and the Mux Control logic internal to the PEs for controlling the Cluster Switch Receive Multiplexers. The Mux Control Logic of FIG. 17 implements the Mux Ctrl Bits equations shown in FIG. 9C for the 2×2 Communication instructions. FIGS. 11C and 11D contain the Mux Ctrl Bit equations for the 2×4 Communication instructions. The same type of apparatus is used in the 4×4 and 4×4×4 of FIGS. 19 and 20 respectively. The Mux Control Logic receives as an input the Configuration and Type of Operation provided from the Receive Instruction and also takes the PE's PID and/or VID as an input to generate the Mux Control Bits.

FIG. 21 shows an extension to the Cluster Switch Mux Controls that allows an adjacent cluster's partner PE to control the selection of any PE in the local PE's cluster. This control is accomplished through the addition of a multiplexer 2700 that selects the Local Mux Ctrl Bits 2702 or the Partner's Mux Ctrl Bits 2703 and by adding the Local Mux Ctrl Bits $C_1C_0$ 2702 and 2703 to the interface between Clusters PE's. The effect this connection has is shown in the tables 2710, 2720, and 2730. When the Cluster Mux Ctrl Bit $C_2$ is 0 (Line 2701=0), then table 2710 governs the control of Cluster Switch Mux 2705. When The Cluster Mux Ctrl Bit $C_2$ is 1 (line 2701=1), then table 2720 governs the control of Cluster Switch Mux 2705. With 2×2 Clusters there are 16 lines added between the clusters to allow the partner PEs control of the data paths within their attached clusters.

In summary, any direct communication path, allowed by the interconnection network, from one PE to another can be described as a mapping from the target PE address (PID or VID) to the source PE address and where such mapping is described as a permutation on the target PE address. The target PE address (PID or VID) is permuted to generate the cluster switch multiplexer controls that create the desired data path between the two PEs.

A PE's target register receives data from its input port. The PE's source register is made available on its output port. The PE's input and output ports are connected to a cluster switch. The cluster switch is made up of multiplexers (muxes) each of which are controlled by individual PEs. The Cluster Switch Mux control settings are specified by the PEXCHG Operations Tables. Each PE's mux control, in conjunction with its partner's mux control, determines how the specified source data is routed to the PE's input port.

Figures 22C, 22D:
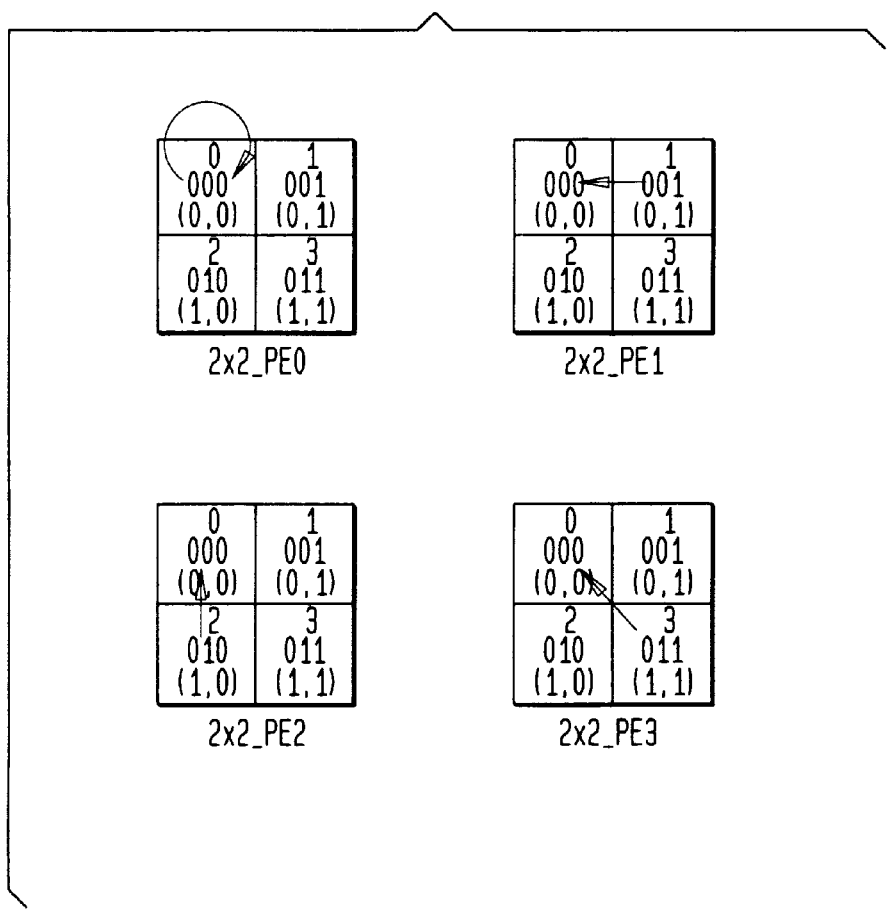
FIGS. 22C and 22D illustrate aspects of SPRECV operations for a 2×2 configuration or array.
Figures 22E, 22F, 22G:
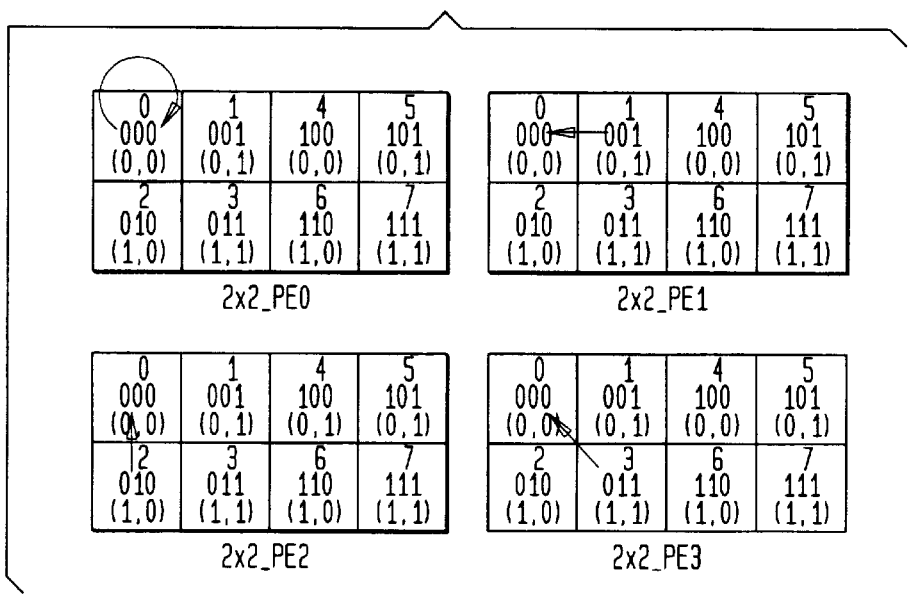
Figure 22H:
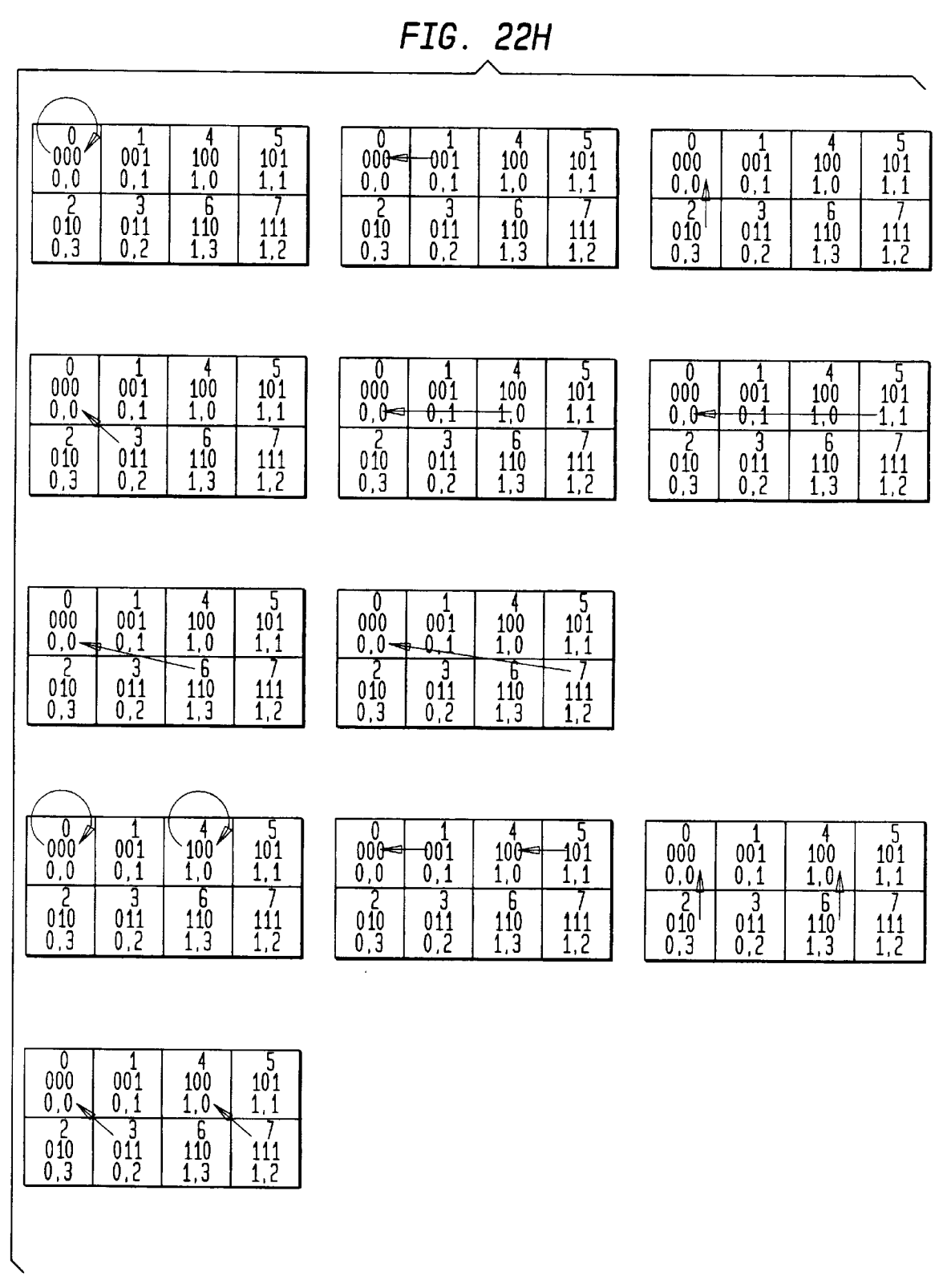

As shown in FIGS. 22A and 22B the SP, being a dynamically merged SP/PEO combination, the SP's target register receives data from the PEO's input port. The source register in each PE is made available on each PE's output port. The switch setting generates controls for the PE's muxes as specified by the RECV tables of 22C, 22E and 22G for 2×2 and 2×4, respectively. In SIMD operation, the switch setting routes data from the specified PE's output port to the PEO's input port which has been taken over by the SP, effectively receiving the specified PE's source register into the SP's target register. FIGS. 22D, 22F and 22H illustrate the SPRECV operation on a 2×2, 2×2 subcluster of a 2×4 and a 2×4, respectively. See also the table key in FIG. 10A. At the end of execute, all PE's source register Rx (including PEO), as specified in the tables, remain on their output port, though in some implementations this may not be necessary.

Each PE also contains a 4-bit hardware Physical ID (PID) stored in a Special Purpose PID register. The 2×2 uses two bits of the PID, the 2×4 uses three bits and the 4×4 uses all four bits of the PID. The PID of a PE is unique and never changes.

Each PE can take an identity associated with a virtual organization of PEs. This virtual ID (VID) consists of a Gray encoded Row and Column value. For the allowed virtual organization of PEs, as shown in FIG. 10B, for example, the last 2 digits of the VID match the last 2 digits of the PID on a subcluster 2×2, and the VID and PID are the same on a 2×4 as shown in FIG. 11A. The 4×4 VID is stored in a Special Purpose VID register as a set of 2-bit fields.

FIGS. 23A and 23B illustrate details of the register broadcast (SPSEND) instruction and operation therewith. The target register of each PE controlled by an SP, receives the SP source register. No output port is made available except for SP/PEO, which makes available the SP's register Rx.

While the present invention has been described in a variety of presently preferred aspects, it will be recognized that the principles of the present invention may be extended to a variety of contexts consistent with the present teachings and the claims which follow.

We claim:

1. A processing machine comprising:
   an array having:
   at least two processing elements (PEs), each of said PEs having an identifying number and combinatorial hardware and needing only a single send-receive port for sending and receiving data from another PE; and
   a sequence processor (SP);
   a connection mechanism for selectable interconnecting the PEs comprising at least one cluster switch multiplexer; and
   a PE communication instruction issued by the SP which is utilized to encode an interconnection path for communication between said at least two PEs wherein said combinatorial hardware interprets the PE communication instruction issued by the SP and selects the interconnection path dependent upon the PE communication instruction and the identifying number.

2. The processing machine of claim 1 wherein the connection mechanism further comprises a plurality of switches which are selectable set in response to the PE communication instruction to define configuration, topology and direction of PE interconnection and the PE communication instruction includes a plurality of bits in the instruction format to encode switch settings for the connection mechanism corresponding to configuration, topology and direction.

3. The machine of claim 1 wherein a logical mapping of the plurality of PEs is stored in a register in each of said PEs and utilized by the combinatorial hardware to select the interconnection path.

4. The machine of claim 1 wherein said array comprises more than two PEs and a PE may utilize the interconnection path to broadcast data to multiple PEs in the array.

5. The machine of claim 1 wherein the array further comprises an additional cluster of PEs, and a partner PE is utilized to enable a communications path between one of said at least two PEs and a PE in the additional cluster.

6. The machine of claim 1 in which the PE communication instruction is a PEXCHG instruction.

7. The machine of claim 1 in which the PE communication instruction is an SPRECV instruction.

8. The machine of claim 1 in which the PE communication instruction is an SPSEND instruction.

9. The machine of claim 1 wherein each PE further comprises a source register and in response to a PEXCHG, SPRECV, or SPSEND instruction received by a PE from the SP the PE is enabled to make its source register contents available on an output port and receive data on an input port.

10. The machine of claim 1 wherein the PE communication instruction is one of a plurality of instructions including PEXCHG, SPRECV and SPSEND instructions.

11. The machine of claim 1 wherein each PE has first and second levels of muxes associated therewith.

12. The machine of claim 1 wherein the identifying number for each PE is a 4 digit identification number which constitutes a hardware identification number (HWID) for the PE.

13. The machine of claim 12 wherein the second and third bits of the HWID represent a cluster number for the PE.

14. The machine of claim 13 wherein the array comprises sixteen PEs and these sixteen PEs are arranged in a 4×4 ManArray subdivided into four clusters 00, 01, 10 and 11.

15. The machine of claim 8 wherein the array comprises a plurality of PEs so that each PE has a horizontal and a vertical partner in the array, with the cluster switch multiplexer further comprising a first and a second level mux for each PE, each PE's second level mux having a connection to an inter-cluster node of both the horizontal and the vertical partner for the PE as well as an inter-cluster node from its own first level mux.

16. The machine of claim 1 wherein the SP further comprises a target register.

17. The machine of claim 12 wherein the HWID is stored in an HWID register.

18. The machine of claim 1 wherein a topology is embedded in the PE communication instruction.

19. The machine of claim 1 wherein the cluster switch multiplexer further comprises a local multiplexer for each PE and each of said PEs further comprises an associated local multiplexer control.

20. The machine of claim 1 wherein the array comprises a plurality of PEs organized by clusters each of said PEs in a cluster has an associated partner PE and an associated partner PE multiplexer control.

21. The machine of claim 1 wherein the cluster switch multiplexer is controlled by a plurality of multiplexer control bits and said machine further comprises a mechanism to permute a PE address label in conjunction with the communication instruction to the plurality of multiplexer control bits utilized to control the connection mechanism for interconnecting said PEs.

22. A method of operating a processing machine having an array comprising at least two processing elements (PEs), each of said PEs having an identifying number and combinatorial hardware and needing only a single send-receive port for sending and receiving data from another PE, the array further comprising a sequence processor (SP), the method comprising:

establishing an interconnection of the PEs utilizing a connection mechanism comprising at least one cluster switch multiplexer;

utilizing a PE communication instruction issued by the SP to encode an interconnection path for communication between said at least two PEs; and interpreting the PE communication instruction utilizing the combinatorial hardware to select a single PE for data to be received by dependent upon the PE communication instruction and the identifying number.

* * * * *